US008600843B2

(12) United States Patent
Bachman et al.

(10) Patent No.: US 8,600,843 B2
(45) Date of Patent: Dec. 3, 2013

(54) METHOD AND COMPUTER SYSTEM FOR SETTING INVENTORY CONTROL LEVELS FROM DEMAND INTER-ARRIVAL TIME, DEMAND SIZE STATISTICS

(75) Inventors: Tovey C. Bachman, McLean, VA (US); Karl Kruse, Akron, OH (US); Joel Lepak, Arlington, VA (US); John Westbrook, Reston, VA (US)

(73) Assignee: Logistics Management Institute (LMI), McLean, VA (US)

( * ) Notice: Subject to any disclaimer, the term of this patent is extended or adjusted under 35 U.S.C. 154(b) by 175 days.

(21) Appl. No.: 13/236,143

(22) Filed: Sep. 19, 2011

(65) Prior Publication Data

US 2012/0004944 A1 Jan. 5, 2012

Related U.S. Application Data

(63) Continuation-in-part of application No. 11/802,072, filed on May 18, 2007, now Pat. No. 8,165,914.

(60) Provisional application No. 61/344,738, filed on Sep. 24, 2010.

(51) Int. Cl.
*G06Q 10/00* (2012.01)
*G06Q 10/06* (2012.01)
*G06Q 10/08* (2012.01)

(52) U.S. Cl.
CPC ............. *G06Q 10/063* (2013.01); *G06Q 10/06* (2013.01); *G06Q 10/087* (2013.01)
USPC .......... 705/28; 705/7.11; 705/7.12; 705/7.13; 705/22; 705/29

(58) Field of Classification Search
CPC .... G06Q 10/087; G06Q 10/06; G06Q 20/203
USPC .................. 705/7.11–7.13, 7.29–7.35, 22, 28
See application file for complete search history.

(56) References Cited

U.S. PATENT DOCUMENTS 5,128,861 A 7/1992 Kagami et al.
5,237,496 A 8/1993 Kagami et al.
(Continued)

FOREIGN PATENT DOCUMENTS

EP 1 647 926 4/2006
JP 7-249082 9/1995
(Continued)

OTHER PUBLICATIONS

Bashyam, S., & Fu, M. C. (1998). Optimization of (s,S) inventory systems with random lead times and a service level constraint. Management Science, 44(12), S243-S256. Retrieved from http://search.proquest.com/docview/213235107?accountid=14753.*

(Continued)

*Primary Examiner* — Oluseye Iwarere
*Assistant Examiner* — Olusegun Goyea
(74) *Attorney, Agent, or Firm* — Staas & Halsey LLP

(57) ABSTRACT

A method or a machine determines minimum (s) and maximum (S) inventory control levels (s, S) for inventory items based upon a demand history of the inventory items, such as demand inter-arrival times (IA) and demand requisition sizes (RS). An expected cost is computed including two or more inventory item cost components of expected cost of ordering, expected cost of carrying inventory, or expected cost of outstanding backorders for the inventory control levels (s, S), directly from frequency statistics of different demand IA and demand RS on an inventory item basis. An optimal inventory control level (s, S) of an inventory item is searched that minimizes the cost of ordering, carrying inventory, and/or backorders, based upon the generated expected cost.

23 Claims, 8 Drawing Sheets

(56) References Cited

U.S. PATENT DOCUMENTS

| | | | |
|---|---|---|---|
| 5,615,109 | A | 3/1997 | Eder |
| 5,897,624 | A | 4/1999 | Ramaswamy |
| 5,963,919 | A | 10/1999 | Brinkley et al. |
| 6,006,192 | A | 12/1999 | Cheng et al. |
| 6,006,202 | A | 12/1999 | Ramaswamy et al. |
| 6,021,396 | A | 2/2000 | Ramaswamy et al. |
| 6,144,945 | A | 11/2000 | Garg et al. |
| 6,205,431 | B1 | 3/2001 | Willemain et al. |
| 6,671,673 | B1* | 12/2003 | Baseman et al. ............ 705/7.26 |
| 7,249,068 | B1* | 7/2007 | Kakouros et al. ............. 705/28 |
| 7,266,518 | B2* | 9/2007 | Klim et al. .................... 705/28 |
| 7,337,031 | B1* | 2/2008 | Birjandi et al. ............... 700/99 |
| 7,496,530 | B2* | 2/2009 | Cheng et al. .................. 705/28 |
| 7,499,766 | B2 | 3/2009 | Knight et al. |
| 7,561,533 | B2* | 7/2009 | Aklepi et al. ................ 370/255 |
| 7,685,015 | B2* | 3/2010 | Najmi et al. ................. 705/7.25 |
| 7,840,449 | B2* | 11/2010 | Ebel et al. .................... 705/28 |
| 8,099,336 | B2* | 1/2012 | Klim et al. .................... 705/28 |
| 8,156,006 | B1* | 4/2012 | Ballenger et al. ............. 705/22 |
| 8,165,914 | B2* | 4/2012 | Bachman et al. .......... 705/7.12 |
| 8,224,717 | B2* | 7/2012 | Giacobbe et al. ............. 705/28 |
| 8,321,305 | B2* | 11/2012 | Komejan et al. .............. 705/28 |
| 8,386,342 | B2* | 2/2013 | Ferreri et al. ................. 705/28 |
| 2002/0169657 | A1* | 11/2002 | Singh et al. ................... 705/10 |
| 2002/0188529 | A1 | 12/2002 | Krever |
| 2003/0055712 | A1 | 3/2003 | Eltchaninoff et al. |
| 2003/0101107 | A1 | 5/2003 | Agarwal et al. |
| 2004/0068344 | A1 | 4/2004 | Tsuji |
| 2004/0202154 | A1* | 10/2004 | Aklepi et al. ................ 370/352 |
| 2005/0075949 | A1 | 4/2005 | Uhrig et al. |
| 2005/0209732 | A1* | 9/2005 | Audimoolam et al. ....... 700/216 |
| 2005/0283404 | A1 | 12/2005 | Young |
| 2005/0288989 | A1* | 12/2005 | Kim et al. ..................... 705/10 |
| 2006/0009988 | A1 | 1/2006 | McCormick |
| 2006/0047559 | A1* | 3/2006 | Jacoby et al. .................. 705/10 |
| 2006/0053069 | A1* | 3/2006 | Ebel et al. ..................... 705/28 |
| 2006/0085299 | A1 | 4/2006 | Goll et al. |
| 2007/0124009 | A1 | 5/2007 | Bradley et al. |
| 2007/0282669 | A1 | 12/2007 | Bachmann et al. |
| 2008/0040183 | A1* | 2/2008 | Birjandi et al. .................. 705/8 |
| 2008/0046309 | A1* | 2/2008 | Birjandi et al. ................. 705/10 |
| 2008/0147490 | A1* | 6/2008 | Najmi et al. .................... 705/10 |
| 2008/0215410 | A1* | 9/2008 | Cheng et al. ..................... 705/8 |
| 2009/0240544 | A1 | 9/2009 | Cheng et al. |
| 2011/0161196 | A1* | 6/2011 | Suguro ......................... 705/26.8 |

FOREIGN PATENT DOCUMENTS

| | | |
|---|---|---|
| JP | 2009-187151 | 8/2009 |
| WO | 00/46733 | 8/2000 |
| WO | 2004/034305 | 4/2004 |
| WO | 2005/008437 | 1/2005 |
| WO | 2006/028952 | 3/2006 |
| WO | 2009/091522 | 7/2009 |

OTHER PUBLICATIONS

Roger Eriksson, "Applying Cooperative Coevolution to Inventory Control Parameter Optimization," Dissertation in the Department of Computer Science, University of Skövde, Sep. 1996, 111 pages.

Kaan K. Katircioglu, "Essays in Inventory Control," Thesis in the Commerce and Business Administration, The University of British Columbia, May 17, 1996, 146 pages.

G. A. Vignaux, "Some Examples of Dimensional Analysis in Operations Research and Statistics," School of Mathematical and Computing Sciences, Victoria University of Wellington, New Zealand, Oct. 16, 2005, 19 pages.

Inventory Management for Items with Sporadic Demand; presented Jun. 2000 by Tovey Bachman.

Inventory Management for Items with Sporadic Demand, Part II; presented Jun. 2002 by Tovey Bachman.

Alternative Inventory Policies for Numeric Stockage Objective (NSO) Items; presented Oct. 2, 2002 by Tovey Bachman.

Alternate NSO Policies for the C-5 Preliminary Findings; presented Jan. 13, 2003 by Tovey Bachman.

Aging Aircraft Support Analyses: Stocking Policy Model Assessment: Update CET26; presented Jun. 23, 2004 by LMI.

Reducing NMCS Incidents for Infrequently Demanded Parts; presented Jun. 24, 2004 by LMI.

Aging Aircraft Support Analyses: Low Density-High Demand, Final Briefing CET 15; presented Aug. 18, 2004 by LMI.

Reducing NMCS Incidents for Infrequently Demanded Parts; presented Nov. 30, 2004 by LMI.

Peak Policy Analysis Land and Maritime Systems; presented May 3, 2005 by LMI.

B-1 NSO Support: Status and Preliminary Results; presented Oct. 21, 2004 by LMI.

Reducing Aircraft Down for Lack of Parts with Sporadic Demand, presented Jun. 21, 2005 by LMI.

Peak Policy in BSM II: Better Management of Sporadic Demand Items; presented Sep. 13, 2006 by the Defense Logistics Agency (DLA).

DLA Weapon System Sustainment example project poster; presented Apr. 16, 2007.

US Office Action issued Apr. 1, 2011 in parent U.S. Appl. No. 11/802,072.

US Office Action issued Sep. 1, 2011 in parent U.S. Appl. No. 11/802,072.

U.S. Appl. No. 11/802,072, filed May 18, 2007, Tovey C. Bachman et al., Logistics Management Institute.

U.S. Appl. No. 61/344,738, filed Sep. 24, 2010, Tovey C. Bachman et al., Logistics Management Institute.

Notice of Allowance mailed Dec. 23, 2011 in related U.S. Appl. No. 11/802,072 (9 pages).

* cited by examiner

METHOD AND COMPUTER SYSTEM FOR SETTING INVENTORY CONTROL LEVELS FROM DEMAND INTER-ARRIVAL TIME, DEMAND SIZE STATISTICS

CROSS-REFERENCE TO RELATED APPLICATIONS

This application is related to, and claims the benefit of priority to, U.S. Provisional Application No. 61/344,738, filed Sep. 24, 2010, in the U.S. Patent and Trademark Office, the contents of which are incorporated herein by reference.

This application is a continuation-in-part of U.S. application Ser. No. 11/802,072 filed on May 18, 2007 now U.S. Pat. No. 8,165,914, the contents of which are incorporated herein by reference.

GOVERNMENT CONTRACT CLAUSE

This invention was made with US Government support under contract No. SP0103-04-D-0008 by the Defense Logistics Agency of the United States (US) Government. The US Government may have certain rights in this invention.

BACKGROUND

1. Field

The embodiments of the invention relate to computing inventory control levels of one or more items in a population of items.

2. Description of the Related Art

An inventory management system for a single site typically manages each item using two control levels: an item's reorder point (ROP), which determines when to order the item, and a requisitioning objective (RO), which determines how much of the item to order. An order is placed when assets on-hand plus on-order decrease to or below the ROP, and the difference between the RO and the current assets is the quantity ordered. If this comparison is made continuously, the inventory control system is known as a continuous review (s, S) policy, where s is the ROP and S is the RO. It is well known that when managing items at a single site, with a positive (or positive plus linear) cost to replenish stock, that an (s, S) policy is optimal. See Scarf, H. "The Optimality of (s, S) Policies in the Dynamic Inventory Problem," *Mathematical Methods in the Social Sciences*, Chapter 13, Stanford University Press, 1960; Axsäter, S. *Inventory Control*, 2nd edition, Springer, New York, 2006, p 140; and Zipkin, P. *Foundations of Inventory Management*, McGraw Hill, Boston, 2000, pp. 395-401. In the case where there is no cost to replenish, an S or (S−1, S) policy is optimal. A case where there is only a positive cost to replenish stock can be considered.

Although the (s, S) policy is optimal, it is computationally intensive to find the optimal values of s and S, and simpler methods are often used. In practice, the RO is often the ROP plus a nominal order quantity, Q, which is often a Wilson Lot-size formula (EOQ) ("economic order quantity")—this is known as (s, Q) or (R, Q) policy—see Axsäter, pp. 140-142. Thus Q is the quantity ordered if assets drop exactly to the ROP. The ROP is an estimate of lead-time demand (LTD) plus a safety level that protects against variability in LTD. An (s, Q) policy works well in the case of unit or constant demand sizes, where the inventory position decreases exactly to the ROP and triggers a replenishment order. In the case of variable customer demand sizes, sometimes known as "lumpy demand", a demand may be large enough to reduce the inventory position from above the ROP to below the ROP by more than Q units. In this case an (s, nQ) policy is sometimes used, where the replenishment order size is the smallest multiple of Q that restores the inventory position to a value above s—see Zipkin, p. 227.

For each type of policy, it is then necessary to find optimal, or at least reasonable values of s and S, or s and Q for each item. Optimality is defined with respect to metrics for customer service, inventory investment, and replenishment cost. Customer service is typically measured in terms of expected (average) backorders, customer wait time, or service level. Inventory investment is typically measured as the average value of inventory on hand, or average value of the inventory position. Replenishment cost is typically measured in terms of the number of replenishment actions per unit time, multiplied by a cost to place a replenishment request. Typically the objective function for the optimization is the sum of terms for (1) expected costs to order replenishment per unit time, (2) expected inventory value, and (3) expected backorders, multiplied by a backorder penalty factor—see Zipkin, p. 213.

Expected costs of inventory and of backorders are computed from the probability distribution of on hand inventory, where negative values denote backordered units. The probability distribution for on-hand inventory is computed from the probability distribution of the inventory position and the probability distribution of leadtime demand. For unit or constant demand sizes, the inventory position is uniformly distributed. For variable demand sizes the distribution of the inventory position is uniform for the (s, nQ) policy with certain restrictions on the demand size distribution—see Zipkin, p. 230, but for the (s, S) policy the inventory position probabilities are not uniform and are computed via renewal equations involving the probabilities for demand sizes—see Sahin, I. "On the Stationary Analysis of Continuous Review (s, S) Inventory Systems," Operations Research, Vol. 27, 1979, pp 717-729; Zheng, Y. and Federgruen (Z-F), A. "Finding Optimal (s, S) Policies is About as Simple as Evaluating a Single Policy", Operations Research, Vol. 39, 1991, pp. 654-665; and Zheng, Y. and Federgruen, "Errata: Finding Optimal (s, S) Policies is about as Simple as Evaluating a Single Policy," Operations Research, Vol. 40, 1992, p. 192. For (s, Q), (s, nQ) and (s, S) policies, a leadtime demand distribution is typically assumed (e.g., Poisson, negative binomial, Normal, Gamma, Weibull), and its mean and variance are estimated—see Axsäter, pp. 140-145. An alternative is to estimate the leadtime demand probabilities via bootstrapping—see Fricker, R., and Goodhart, C., "Applying a Bootstrap Approach for Setting Reorder Points in Military Supply Systems," Naval Research Logistics, vol. 47, no. 6 (2000): 459-478.

In summary, in the case of (s, Q) or (s, nQ) policies, expected replenishment costs per unit time are typically computed using the theoretical probability distribution for demand sizes and the assumed Q—see Zipkin, p. 229. For (s, S) policies, expected replenishment costs are computed from the renewal density, derived from the theoretical probability distribution of demand sizes, as well as from s and S—see Sahin and Zheng. In addition, expected cost of holding inventory and expected cost of backorders could be computed from the theoretical probability distribution of on hand inventory, where negative values for on hand inventory denote backordered units. Therefore, a related method for determining optimal inventory control levels (s, S) assumes theoretical probabilities, including for leadtime demands, and assumes an average demand size. In other words, the related method assumes probability distributions, which requires estimating all of the parameters (number of demands in a leadtime, time of (mean) demand, size of demand (requisition size)) to yield assumed probability distributions. However, this introduces errors in both the estimating of parameters and the assumed probability distributions.

Optimization methods—see Zipkin, pp. 223-224 and Zheng—are then applied to the cost function to solve for the values of s and Q, or values of s and S for each item that minimize overall expected costs.

The state of the system typically changes over time as demand patterns for individual items experience fluctuations or trends. This is typically treated by periodically updating the mean and variance estimates for the assumed probability distribution of leadtime demands, re-computing the expected costs, and re-running the optimization.

A limitation of the (s, nQ) policy is that it is not the optimal form of policy, so for populations of items with certain characteristics, the use of such a policy will result in excessive inventory, inferior customer service, and excessive replenishment workload.

A limitation of the approach described earlier for optimizing inventory levels under an (s, S) policy is that for a population of items in which the demand sizes vary over a wide range, the computation of items' inventory position probabilities may be impractical, based on computational resources required.

A limitation of the (s, S) inventory levels computation described earlier is that, for items in certain populations, computationally tractable theoretical distributions do not fit actual distributions of leadtime demand well. This leads to an inaccurate assessment for the costs of backorders and inventory, and therefore results in inventory levels that produce excessive inventory, inferior customer service, and excessive replenishment workload.

A limitation of the (s, S) inventory levels computation described earlier is that, for items in certain populations, parameter estimates for theoretical distributions are subject to errors as large as 100 to 200 percent.

A limitation of the bootstrapping approach for developing a probability distribution of leadtime demand is that for large item populations, it is impractical, based on computational resources required.

A limitation of the (s, S) inventory levels computation described earlier is that, for large populations of items, the computation of the cost function is impractical, based on computational resources required.

A limitation of the (s, S) inventory levels computation described earlier is that the cost function penalizes only expected units backordered, not expected requisitions backordered. This results in a significant imbalance in customer service and investment across items with small and large demand sizes, leading to excessive inventory for items with large demand sizes and inferior customer service for items with small demand sizes.

A limitation of the (s, S) inventory levels computation described earlier is that the optimization algorithm may invest heavily in inventory for a small number of items, resulting in inferior customer service for the majority of items in the population.

SUMMARY

According to an aspect of an embodiment of the invention minimum (s) and maximum (S) inventory control levels for one or more items in a population of items, typically thousands or hundreds of thousands of items, is computed by a computer using a continuous review ordering doctrine. A unique process of computing those control levels is described herein.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
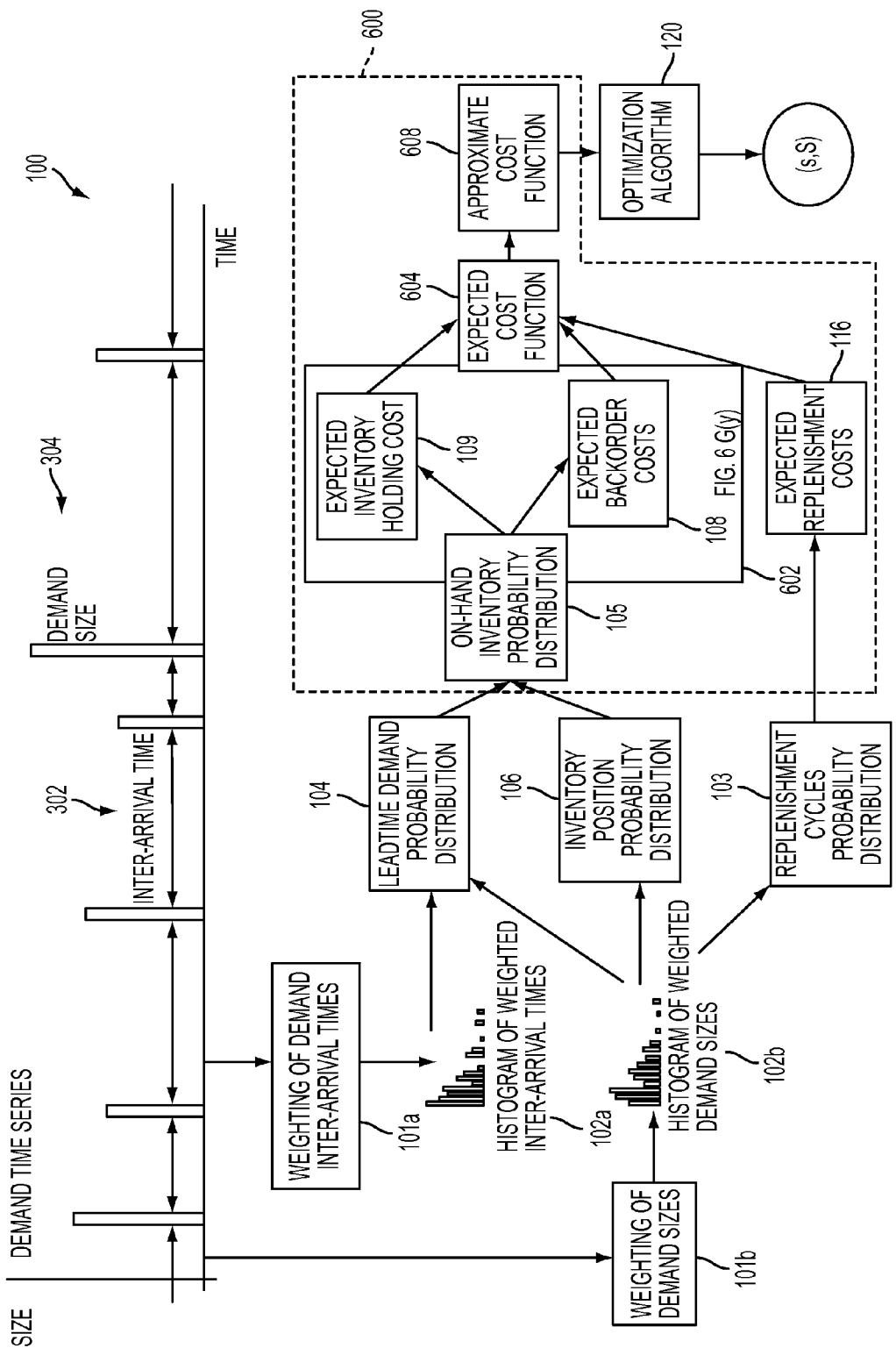
FIG. 1 is a flow diagram of an adaptive method for setting inventory control levels from demand inter-arrival time and/or demand size statistics, according to an embodiment of the invention.

According to an aspect of an embodiment of the invention, a computer is configured to execute the described operations.

An inventory at a single site with a large population of items (thousands to hundreds of thousands of stock numbers) can be considered, where shortages are backordered and there is a fixed positive cost for a replenishment action. The method employs an (s, S) policy for inventory control. One or more goals of embodiments of the invention for computing ROPs (minimum inventory control level of s) and ROs (maximum inventory control level of S) are to:

Reduce expected requisitions backordered and the number of replenishment actions required, for a given inventory investment;

Reduce expected wait time to satisfy requisitions and the number of replenishment actions required, for a given inventory investment;

Reduce inventory investment and replenishment actions required, for a given expected wait time or expected number of backordered requisitions;

Provide customer service improvements that are balanced across items with small and large requisition sizes, for a given inventory investment;

Avoid concentrating inventory investment in a small number of items;

Adapt ROPs and ROs to changes in demand patterns; and to

Be feasible with limited computing resources.

More particularly, the embodiments of the present invention determine optimal inventory control levels (s, S) based upon discrete demand size and inter-arrival time distributions, using empirical demand data, which explicitly bases the inventory control policy (s, S) on actual item demand patterns. The term 'discrete' refers to a non-continuous distribution of an inventory item demand. The embodiments described utilize as an example a discrete inventory demand distribution based upon empirical data, however, the embodiments are not limited to such a configuration and a theoretical discrete distribution like a geometrical distribution can be utilized for demand sizes and/or inter-arrival times. According to an aspect of an embodiment, the optimal (s, S) is obtainable for frequently demanded inventory items. According to an aspect of an embodiment, the optimal (s, S) is obtainable when the distribution of inventory positions of inventory items is not uniform. According to an aspect of an embodiment, Sahin's cost function is extended to apply to discrete demand processes and utilizing empirical distributions as inputs to Sahin's equations. According to an aspect of an embodiment, inventory control levels (s, S) are calculated without assuming probability distributions for the demand process and/or without assuming parameters of the demand process. Lastly, the conventional approach relies on computing a Q first, then exploiting the convexity of the objective function in s for fixed Q to rapidly compute a reorder point (or a safety level). It thus avoids the fact that the cost function is not jointly convex in the discrete variables s and Q (or in s and S). Thus the conventional approach does not jointly optimize s, which affects customer wait time, and Q which affects replenishment workload as well as customer wait time. The conventional approach can be economically inefficient and generate excessive procurement workload. An item refers to a physical article and/or a work (task, job, event) to be performed. An inventory item described in connection with the embodiments of the invention refers to a value stored in a computer readable data structure that is a representation of an item.

In summary, the conventional approach can suffer from several problems:

Conventional approach relies on theoretical probability distributions which do not fit leadtime demand data;

Conventional approach relies on a constant or average demand size, leading to a uniform distribution of the inventory position, which does not fit the data;

Conventional approach requires parameter estimation for the leadtime demand distribution, but the mean and variance have large errors (100 to 200 percent for the mean); and Conventional approach does not simultaneously optimize s and Q (or s and S), leading to an inefficient tradeoff between procurement workload and customer service.

The result of the poor fit of the conventional approach to the underlying phenomena is excessive inventory investment, excessive procurement workload, and suboptimal customer service. What is needed is a stock level computation based on a more realistic model of the demand process and the system's response to it.

FIG. 1 is a flow diagram of an adaptive method for setting inventory control levels from demand inter-arrival time and/or demand size statistics, according to an embodiment of the invention. The embodiments are implemented by a machine 100, for example, a computer. The method starts by collecting data for each item's demand inter-arrival times 302 and demand sizes 304, over a prior period of time, termed the lookback period. These data are then weighted at 101*a*, 101*b* by adjustment factors that decrease as the amount of time since the data were collected increases. The method at 102*a*, 102*b* creates histograms for demand inter-arrival times and demand sizes from items' adjusted demand inter-arrival times and adjusted demand sizes respectively.

The method follows Sahin's approach to compute each item's probability distributions for the inventory position at 106 and for leadtime demand at 104, as well as expected procurement (replenishment) cycle time at 103, from the histograms described above.

From (1) the probability distributions for the inventory position at 106 and (2) the probability distribution for leadtime demands at 104, from both of which the on-hand inventory probability distribution has been obtained at 105, and (3) the replenishment cycle time probability distribution (renewal function—FIG. 6) at 103, the following categories of cost terms, namely cost of backorders, carrying inventory, and replenishment, are computed as follows: (a) cost of expected unit backorders at 108, (b) cost of expected on-hand inventory at 109, and/or (c) cost of expected number of replenishment actions per unit time at 116. Inventory Position (IP) at 106 refers to quantity of inventory on-hand plus quantity of inventory due-in. On-hand inventory refers to a current quantity of inventory without due-in (do not have due-in), or just work on the shelf that is positive, and if on-hand inventory is negative then there would be backorders. The expected requisitions backordered can be computed based on earlier results of Kruse. The method then at 604 stores the components of an expected (as an average or mean of) overall cost function of items' ROPs and ROs, with terms for the expected cost of replenishment actions from 116, expected cost (penalty) for unit backorders from 108 (in FIGS. 6, 108 and 112), expected cost (penalty) for requisition backorders from 108 (in FIGS. 6, 108 and 114), expected cost of holding on-hand inventory from 109, and an additional penalty term for the inventory position (in FIG. 6, 110). In other words, 604 stores the backorder costs and holding costs from 602, namely the backorder 108 and holding cost terms 109, 110 (107) conditioned on the inventory position (IP) (i.e., an instantaneous cost of back orders 108 and carrying inventory 107, conditioned on the inventory position (IP) G(y)) for a range of values of y (IP), together with the replenishment cost from 116. In FIG. 1, at 608, a unimodal approximation may be performed (in FIG. 6, 606). At 608 (606) the conditional cost of backorders and holding inventory G(y) can be approximated by a unimodal function, so as to meet sufficient conditions for the Zheng-Federgruen optimization algorithm to be applied at 120. In particular, at 608 (606), the sum of backorder and holding cost terms from 604 is approximated, and if the sum of an instantaneous cost of back orders 108 and carrying inventory 107, conditioned on the inventory position (IP) G(y), does not have the properties for an optimization algorithm such as the Zheng-Federgruen optimization to apply without being caught in a non-optimal minimum, this sum is approximated at 608 (606) by a new function to be unimodal to satisfy conditions of an optimization algorithm. In other words, one example technical problem solved is to establish or implement using a computer processor a unimodal approximation of a sum of an instantaneous cost of back orders 108 and carrying inventory 107, conditioned on the inventory position (IP) G(y). At 608, an overall cost function is computed by averaging (the unimodal approximation as the case maybe) to the instantaneous cost of backorders and holding (carrying) inventory from 606 across the possible values of the inventory position y, (i.e. across the probability distribution for the inventory position (IP) from 106 in FIG. 6), and then adding the replenishment cost from 604. In this averaging, each term in the unimodal approximation, corresponding to a particular value of the IP y, is weighted by the corresponding probability of that inventory position.

At 104, computational efficiency in developing the cost function is gained through use of a virtual unit of issue on items with a large range of requisition sizes 102*b*, as well as use of transform methods at 104 and Normal approximations at 106 to compute convolutions required by the cost function at 600.

The method results in inventory investment reductions as large as 24 percent, reductions in requisition wait time and requisition backorders as large as 35 percent, and reductions in replenishment workload as large as 50 percent.

The method adapts well to periods of declining demand and periods of increasing demand, in that benefits to above metrics are preserved.

Improvements in these metrics are balanced across items with small and large requisition sizes.

Improvements in these metrics are not concentrated in a small number of items.

Computational efficiency improvements described above reduce run-time by a factor of 70, relative to use of the unmodified Sahin and Zheng-Federgruen algorithms in the prior art. This makes the method practical for populations of hundreds of thousands of items on a 64-core parallel processing platform.

A cost function construction process is described according to an embodiment of the present invention. In any continuous review of minimum (s) and maximum (S) inventory control levels, namely an (s, S) system, an item's inventory position (IP=quantity on hand plus due-in, where negative on-hand denotes backorders) is continuously compared to the lower control level s. If IP is less than or equal to s, an order of size (S minus IP) is placed. A known, positive, lead time for replenishment can be assumed.

For example, suppose that the invention computes a lower control level of 5 units and an upper control level of 10 units, and that at that time, the IP consists of 8 units, where 3 are on hand and 5 are due in. Note that the invention does not need to compute an order quantity—which might not be determinable at the time the control levels are computed. At some later time, the next customer demand occurs, for 4 units—it can be assumes that this occurs before any of the due-in units arrive. This demand drops the IP from 8 units to 4 units, where 5 are due in and the on hand is now −1 (one unit on backorder). Comparing the IP, which is 4 units, to the lower control level s, which is 5 units, it can be determined that the IP is now below s. The system therefore places an order equal to S−IP=10−4=6. The total due in is now raised from 5 to 11, and the on hand is still is −1, so the inventory position IP has been restored to the upper control level S.

Note that the order quantity 6 could not have been known at the time the control levels were computed, and does not need to be part of what the invention produces as an output; rather the order quantity is a result of combining the control levels with customer demand that cannot be known in advance. That customer demand is external to the control system and is an input to the invention. Also, according to an embodiment of the invention, the upper and lower control levels (s, S) need not be based on a forecast, and according to an aspect of an embodiment, (s, S) are not based upon a forecast as described herein. In other words, (s, S) control levels of the embodiments are inventory item control levels used to make a fundamental decision in any instant in time (at any point in time) of should and/or how much inventory replenishment orders be placed?

Each inventory item's lower (s) and upper (S) control levels can be computed. To do this a cost function is computed dependent on the control levels desired to be solved. The cost function also requires inputs for costs to carry inventory at 107 (e.g. 20 percent per dollar of inventory carried per year), for inventory on-hand 109 and/or total inventory position 110, cost to place a replenishment order (outgoing) to suppliers (e.g. $100 per replenishment action) 116, cost of carrying backorders 108 (e.g. $500 per backordered requisition 114 outstanding per year and/or unit backorders outstanding per year 112), unit price of the item, leadtime for the item (e.g. 3 months to get a replenishment), and each item's demand history, including transactions for incoming customer orders, with dates and quantities requested.

Once the cost function is constructed, an analytical (no simulation) optimization algorithm is applied to search for the control levels (s, S) for each item that minimize the total long-term average cost (of carrying inventory, making replenishment orders, and backorders). The invention's work could be done once these control levels are computed, although they may be updated periodically (e.g. monthly or quarterly). No order quantity or forecast needs to be computed.

Figure 2:
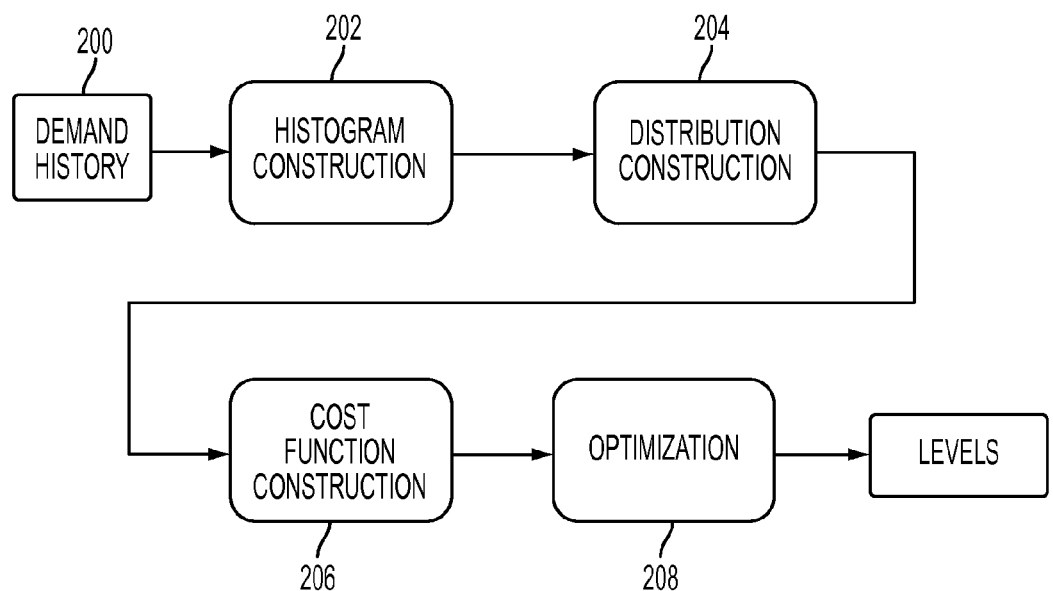
FIG. 2 is a flow diagram of constructing a cost function and then obtaining lower (s) and upper (S) control levels, from a demand history, according to an embodiment of the invention.

The following provides more detail on how the cost function is computed according to an embodiment of the invention. FIG. 2 is a flow diagram of constructing a cost function and then obtaining lower (s) and upper (S) control levels, from a demand history. A method of determining minimum (s) and maximum (S) inventory control levels (s, S) for inventory items based upon a demand history of the inventory items, is provided by configuring and/or causing a machine, for example, a computer, to execute generating at 202 (e.g., 102a, 102b) histograms of inter-arrival times (IA) and requisition sizes (RS), based upon the demand history of the inventory items; generating at 204 (e.g., 104, 106, 103), for a set of control levels (s, S), a probability distribution for a lead time demand (LTD) in future based upon the IA and/or RS histograms, a probability distribution for an inventory position (IP) based upon the RS histogram, and/or a replenishment cycles probability distribution; and generating at 206 (e.g., 600 including 602) a cost function based upon the LTD and the IP probability distributions. A probability distribution for a lead time in future for a cost term refers to a predicted distribution of future cost (a cost realized a lead time in the future) that is based upon actual inventory item demand data as opposed to assumed inventory item demand data.

Figure 3:
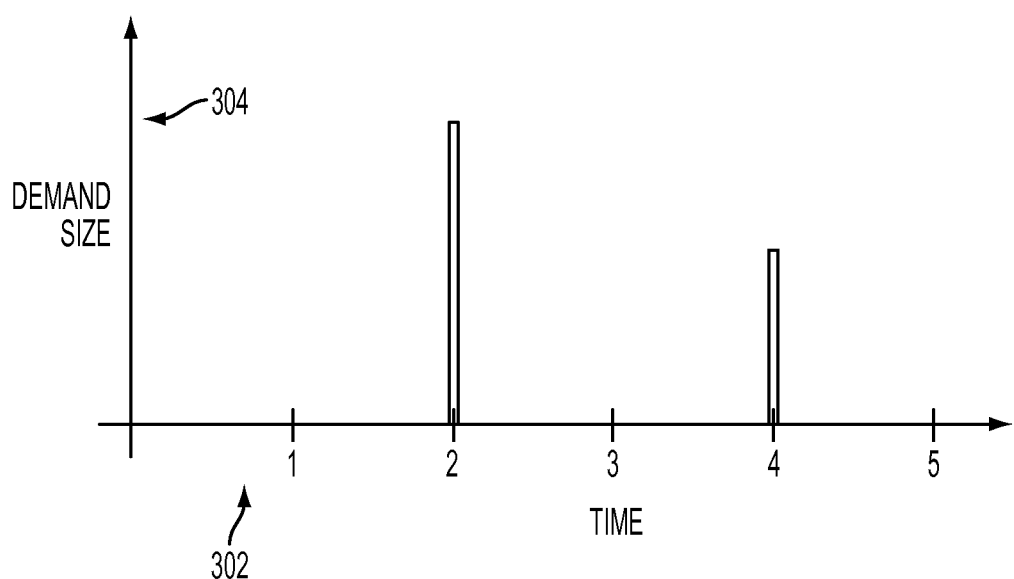
FIG. 3 is an example graph of a demand history for an inventory item, according to an embodiment of the invention.

At 206, the cost function 600 includes one or more of an instantaneous cost 602 of on-hand inventory 109, holding inventory (on-hand inventory plus full inventory position) 110 or outstanding backorders 108, and/or a replenishment cost 116. At 208 (e.g., 120) the generated cost function is processed, subject to an optimization process (as the case may be), to search for the inventory control levels (s, S) for each inventory item. An example of an optimization process at 208 can be the Zheng-Federgruen optimization process. FIG. 3 is an example graph of a demand history for an inventory item input at 202 for the histogram construction, according to an embodiment of the invention.

Figure 4:
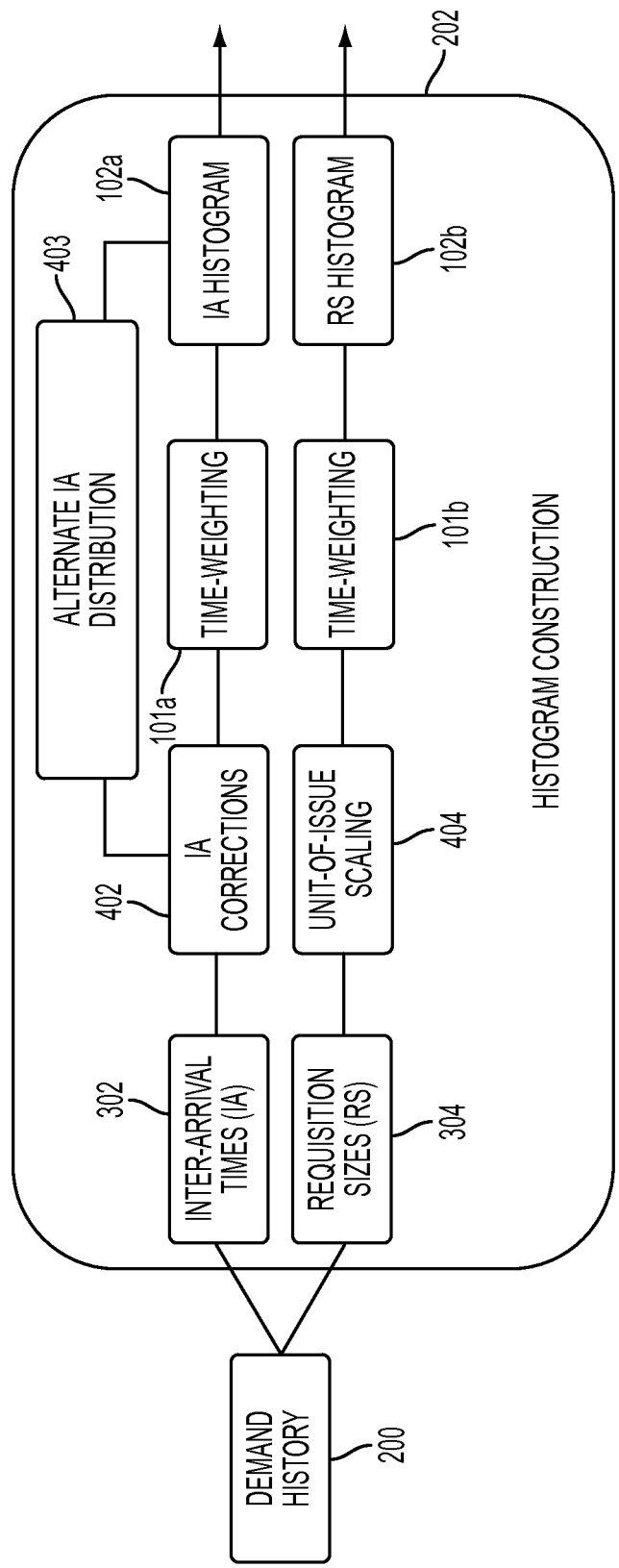
FIG. 4 is a flow diagram for constructing a histogram based upon demand history, according to an embodiment of the invention.

FIG. 4 is a flow diagram for constructing a histogram based upon demand history, according to an embodiment of the invention. The following notations are used. In the definitions below, "equilibrium" refers to steady state, or mathematically, limiting behavior as time goes to infinity.

$a(t)$=probability density function for requisition interarrival times $A(t)$=cumulative distribution function (CDF) for requisition interarrival times $A_n(t)$=n-fold convolution of $A(t)$, $n>0$; $A_0(t)=1$.

$b(k)$=density for requisition sizes, assumed discrete $B(k)$=CDF of requisition sizes $b_n(k)$=n-fold convolution of $b(k)$ $B_n(k)$=n-fold convolution of $B(k)$; $B_0(t)=1$ Notations 1

$c(s, S)$=expected cost per unit time with ROP=s and RO=S $D$=equilibrium leadtime demand $\Delta = S-s$ g(y)=probability density for leadtime demand G(y)=instantaneous backordering and holding cost with inventory position y H(y)=instantaneous holding cost with inventory position y I=onhand inventory in equilibrium=I(s, S); I≥0 means backorders $I^+$=max($I^-$, 0)$I^+$(s, S)≥0

$I^-$=min($I^-$, 0)=$I^-$(s, S)<0

$I_p$=inventory position in equilibrium=$I_p$(s, S); takes on values from −∞ to S K=administrative cost to place a replenishment order L=leadtime (constant)

$\mu_a$=mean interarrival time for requisitions

P(y)=short-term backorder cost with inventory position y r(k)=renewal density of requisition sizes for a total quantity demanded k; r(0)=1

R(k)=renewal function for requistion sizes for a total quantity demanded k; R(0)=0

S=requisitioning objective (RO)

s=reorder point (ROP)

The Sahin objective function is expressed in terms of item demand size 304 and inter-arrival time 302 statistics in 202, both of which are available in input demand data 200. Expressions are developed for the probability distributions of the inventory position 106 and for leadtime demand 104, and from these an expression for the probability distribution of on-hand inventory 105 (can be negative, meaning backorders) can be obtained. From the on-hand inventory probabilities 105 and the renewal function of the demand sizes 103 the expected total cost per unit time is computed at 608. In other words, from the on-hand inventory probability distribution 105 derived from the empirical histogram distributions, in 602 expected values (mean or average value of a random variable) are computed. The cost function is put into a form that satisfies the Z-F hypotheses and allows use of their stock level optimization algorithm at 120.

The demand process including inter-arrival times (IA) 302 and requisition (demand) sizes 304 is treated as a compound renewal process, or renewal reward process, taking into account renewal theory. For background, see Feller, W., "An Introduction to Probability Theory and Its Applications," Vol. I., 3rd ed., Wiley, New York, 1968; Feller, W., "An Introduction to Probability Theory and Its Applications," Vol. II., 2nd ed., Wiley, New York, 1971; and Ross, S. M., "Applied Probability Models with Optimization Applications," Dover, Mineola, N.Y., 1992. The interarrival times for an item's demands are $t_1, t_2, \ldots t_n, \ldots$, which are taken to be discrete, with time units in days; if more than one demand for an item occurs in a day, those demands can be aggregated into a single one for that day. The demand (or demand) sizes are $d_1, d_2, \ldots d_n, \ldots$, where the process starts at time t=0, the first demand of size $d_1$ occurs at t=$t_1$, the second demand of size $d_2$ occurs at time t=$t_1$+$t_2$, and so on. Beyond the assumption that the pairs $\{(t_n, d_n)\}$ are mutually independent, required for a renewal reward process, $d_n$ is also treated as independent of $t_n$, as required in Sahin.

In the demand arrival process, a renewal at time t means that for some number of demands n, $t_1+\ldots+t_n$=t. At a renewal time, the process of waiting for the next demand restarts—the process from there on is probabilistically equivalent to the one that starts at t=0. For the demand size process, the role of total time elapsed is replaced by total quantity demanded since the process started, irrespective of time, and a renewal at a quantity k means that for some number of demands m, $d_1+\ldots+d_m$=k. So the times at which renewals of the demand arrival process can be observed are those attainable as the sum of interarrival times, and demand quantities at which the renewals of the demand size process can be observed are those attainable as the sum of demand sizes.

Regarding renewal theory, let $X_1, X_2, \ldots X_n, \ldots$ be a sequence of independent, identically distributed (IID), non-negative random variables with common mean $\mu<\infty$, let $S_0=0$, and let $$S_n = \sum_{i=1}^{n} X_i \text{ for } n \geq 1. \quad (1)$$

$$N(t) = sup\{n: S_n \leq t\}; \quad (2)$$

then $\{N(t)\}_{t\geq 0}$ is a renewal process.

The function E(N(t)) is known as the renewal function, and when t is a continuous real variable, its derivative E"(N(t)) is the renewal density. The renewal function E(N(t)) is the expected number of jumps (increases) in $S_n$ that occur before $S_n$ exceeds t, and the renewal density is the rate at which the expected number of jumps is changing with respect to t. If a jump in $S_n$ occurs at t, then the process of counting jumps starts over at t and we say that a renewal occurs at t.

If $X_1, X_2, \ldots X_n, \ldots$ are discrete, then we replace t with a discrete variable k and we have a discrete renewal process. Let the common density of the random variables $X_1, X_2, \ldots X_n, \ldots$ be f(k); then the density for $S_n$ is the n-fold convolution of f(k), which we denote by $f_n(k)$.

Because the renewal process is discrete, jumps in $S_n$ can only happen at integral values, so the renewal density (rate of change of expected renewals) is zero except at integers k, where the rate of change is equal to the probability of a renewal at k. We have a renewal at k if and only if $S_n$=k for some n≤k. Noting that Pr($S_n$=k)=$f_n$(k) and summing over all possible values of n≤k (all the ways that we can have $S_n$=k), we find that the renewal density, or probability of a renewal at k is $$r(k) = \sum_{n=1}^{k} f_n(k). \quad (3)$$

The renewal function R(k), the expected number of renewals in a quantity k, can be found by "summing the tails" of the distribution for the probability that there is a renewal at k. Since having at least j renewals occur in the range 0, 1, 2 . . . , k is equivalent to the sum $S_3$ not exceeding k, then:

$$R(k) = E(N(k)) \quad (4)$$

$$= \sum_{j=1}^{k} Pr(N(k) \geq j)$$

$$= \sum_{j=1}^{k} Pr(S_j \leq k)$$

$$= \sum_{j=1}^{k} \sum_{i=j}^{k} Pr(S_j = i)$$

$$= \sum_{j=1}^{k} \sum_{i=j}^{k} f_j(i)$$

$$= f_1(1) + f_1(2) + \ldots + f_1(k) + f_2(2) + \ldots +$$

-continued $$f_2(k) + \ldots + f_k(k)$$

$$= \sum_{i=1}^{k} \sum_{j=1}^{i} f_j(i)$$

$$= \sum_{i=1}^{k} r(i)$$

So the expected number of renewals at k, R(k), is just the sum of probabilities of a renewals at 1, 2, ... k.

Regarding a renewal-reward process, or a compound renewal process. Assume that $X_1, X_2, \ldots X_n, \ldots$ and $\{N(t)\}_{t\geq 0}$ form a renewal process as above, that $Y_1, Y_2, \ldots, Y_n, \ldots$ are non-negative IID random variables—$Y_n$ is the reward associated with the jump in $S_n$. If the pairs $(X_n, Y_n)$, n=1, 2, ... are mutually independent, then they form a renewal reward process, and $$Y(t) = \sum_{k=1}^{N(t)} Y_k \quad (5)$$

is the total reward earned in the interval [0, t]. A renewal reward process may be viewed as a generalization of a compound Poisson process. Since the distribution of $X_1, X_2, \ldots X_n, \ldots$ need not be exponential, the process may not be "memoryless."

The renewal function and renewal density are used for the demand size and arrival processes, but optionally not for the arrival process. The renewal density r(k) for demand sizes is the probability of a renewal at a total quantity demanded of k, that is the probability that some number of demands have quantities that sum to k units. The renewal function for the demand size process R(k) is the expected number of demands it takes to obtain a total quantity of k units demanded.

The inventory system operates under an (s, S) continuous review ordering doctrine (day-by-day is close enough for purposes of the embodiments). Under continuous review, the inventory position (IP) is compared to the ROP each time there is a demand, to see if an order should be placed; the same action is taken whenever the ROP is updated. The system has a fixed non-zero cost to place an order, holding cost proportional to on-hand inventory, and backorder penalty cost applied to expected backorders. Under these conditions, an (s, S) policy can be optimal.

The embodiments compute an (s, S) for each item in the inventory so that the total expected cost per unit time, including ordering, holding (carrying), and backorder costs, summed across items, is minimized according to application criteria. Conventionally the inventory holding cost is applied to the inventory position (on-hand plus on-order), while the embodiments apply the inventory holding (carrying) cost to the on-hand inventory 109 as well as full inventory position 110 from 107. The difference between conventional cost function and the embodiment model's cost function is the way expected ordering 116, holding (carrying) 107, and backorder 108 costs for an item, per unit time, are computed. Each of these expected cost terms will depend on the (s, S) that have been selected.

To obtain the ordering cost term 116, the expected number of replenishment orders placed per unit time is needed. This is equivalent to the expected number of restorations of the inventory position (IP) to S per unit time, or the number of cycles of the inventory position to S per unit time, which is derived from the demand process (i.e., histogram and distribution constructions 202, 204 based upon input of the empirical demand history). For computing expected holding 107 and backorder 108 cost, the probability distribution of on-hand inventory 105 is needed, which can be determined from the probability distributions of the inventory position 106 and of leadtime demand 104, both of which are deduced from the demand process 202.

In FIG. 4, from the transactional customer demand history (actual or empirical demand history) 200 two data sets are created:

(1) Inter-arrival times (IA) 302, the times between nonzero requisitions.

(2) Requisition sizes (RS) 304, the nonzero demand requisition sizes.

The IA and RS data sets are processed similarly, with a distinct step for each that aims to improve performance in certain cases. The key features for creation of the IA and RS are:

1. Construction of histograms directly from the actual demand history, with no intermediate approximations.

2. Rescaling requisition sizes to a virtual unit-of-issue, to allow for efficient computation of the full lead time demand distribution in the case of items with long lead times and large requisition sizes.

3. Weighting of IA and RS observations to construct histograms adaptively when the underlying demand process is changing rapidly.

4. Optional corrections to the IA histogram to handle the case of a sparse demand history.

Regarding rescaling of the requisition sizes, the requisition sizes are optionally rescaled down using a virtual unit-of-issue. For example, if the maximum observed requisition size is 1e6, and the maximum allowable virtual requisition is 1e4, then each requisition size is scaled by dividing by 1e2 (the virtual unit-of-issue)—this gives a new maximum virtual requisition size of 1e4. Requisition sizes are rounded appropriately to maintain the number of nonzero observations, and so that the overall mean becomes approximately the original mean divided by the same factor (1e2 in the example). This mechanism provides a way to rescale the distribution to reduce memory requirements and/or computer processing time. The remaining computations for the inventory control levels are carried out as described below, but the final inventory control levels after 120 are rescaled back up by the same virtual unit-of-issue that was applied to the requisition sizes. In other words, after an inventory item's preliminary control levels (s, S) are computed, each of s and S would be multiplied by the virtual unit-of-issue factor (1e2 in the example) to yield the final (s, S) for that item.

More particularly, in FIG. 4, at 404 a major computational issue with the original cost function and histogram construction procedure is handled, namely the wide range of requisition sizes 304 observed in demand history data 200. Therefore, at 404, a unit-of-issue scaling is applied to the requisition sizes (RS) data 304. Some items receive requisitions ranging from 5 to 50,000 or more. The support of the associated lead time demand distribution could be so large that memory issues arise.

This problem was solved by adjusting the unit of issue for such items with huge ranges of requisition sizes. By declaring an artificial unit of issue of 100 for the example above and rounding appropriately, the range of requisition sizes becomes a more manageable 1 to 500.

A heuristic rounding technique is used to keep the overall distribution mean roughly the same. When a unit of issue rescaling is applied, we cannot round all small requisition quantities to zero and eliminate them—otherwise, only large requisitions would remain and the distribution mean would be too large. Thus, sizes are rounded, but floored at 1. The resulting excess from rounding up toward 1 is subtracted from requisition sizes that round to values larger than 1. More formally, the following Process 1 is applied to the set of requisition sizes:

---
Unit of Issue Rounding Process 1:

Input: Requisition sizes RS={$r_1, r_2, ..., r_N$}, unit of issue U.
Output: Scaled requisition sizes $RS_n$.
1.    Initialize remainder=0, $RS_n$={ }.
2.    For each r in RS:
    a.    Let r' = max{1, round(r/U)}.
    b.    Let remainder = remainder + r/U − r'.
    c.    While remainder≥ 1 :
        i.    Transfer 1 unit from remainder to r'.
    d.    While r' > 1 and remainder≤ −1 :
        i.    Transfer 1 unit from r' to remainder.
    e.    Insert r' into $RS_n$.
---

Step 2b tracks the cumulative remainder from rounding, and steps 2c and 2d transfer that cumulative remainder to the rounded values, attempting to ensure that the absolute cumulative remainder remains below 1.

The full process is then executed using the normalized requisition sizes $RS_n$ to get levels ($s_n, S_n$), and the final output is the set of rescaled levels:

$$\text{Rescaled final levels}=(Us_n, US_N) \quad (B1)$$

In FIG. 4, at 402, optionally the inter-arrival times (IA) data 302 can be corrected. The input inter-arrival times 302 are based on observations within a window of width W, say the time interval [0, W]. If the observations take place at times {$t_1$, $t_2$, . . . , $t_N$} then the inter-arrival times are IA={$t_2-t_1$, $t_3-t_2, ..., t_N-t_{N-1}$}. When the number of observations is large relative to the size of the window, this is satisfactory, but if $t_1$ is much larger than 0, or $t_N$ is much less than W (meaning there is a large gap at the start or end of the window), then the computed inter-arrival times may not reflect the observed demand frequency.

As an example, say the window is [0, 100], and demands were observed only at times [70, 75]. The single observed inter-arrival time is of length 5, but the observed demand frequency is much lower than once every 5 days.

The embodiments of the invention provide two methods for dealing with lack of inter-arrival time information on the window boundaries. The first is to create artificial inter-arrival time observations based on gaps at the left and right end of the observation window. Specifically, first the set of observed inter-arrival times IA and the mean observed inter-arrival time $\overline{IA}$ is computed. Second, the left- and right-boundary interval widths are computed:

$$IA_l=t_1$$

$$IA_r=W-t_N. \quad (C1)$$

These values are inserted into the set IA, but only if they exceed $\overline{IA}$; this restriction is to prevent artificially low values from being used. For adaptivity considerations (as described in connection with time weighting 101a, 101b of the IA 302 and RS 304), $IA_l$ is considered to have age W, and $IA_r$ is considered to have age $W-t_N$.

In FIG. 4, at 403, a second method for dealing with a sparse set of inter-arrival time information is to abandon the inter-arrival time observations, and model the inter-arrival times using a geometric distribution based solely on the observed demand frequency. Given an observation window of width W and N observations, a geometric distribution with mean $$\mu_{IA}=W/N \quad (C2)$$

is used to model the inter-arrival times. Typically, this optional approximation should be used in the case of extremely few observations (less than about five).

Therefore, regarding corrections to the IA histogram at 402, sparse demand histories can yield problematic IA distributions if no corrections are made. Two methods are provided to handle the lack of IA data:

1. At 402, treating the time since last demand, and the time from start to first demand as inter-arrival time values. In the example in FIG. 3, assuming the start time is 0 and the current time is 5, the intervals [0,2] and [4,5] would be treated as inter-arrival periods, so 2 and 1 would be used as inter-arrival times (in addition to the single true inter-arrival time of 2.

2. Alternatively, at 403, using a geometric distribution based on the overall demand rate to approximate the true IA distribution.

At 101a, 101b, regarding weighting of the IA and RS observations, the observations in data sets IA and/or RS are weighted according to their age, with the weight decreasing (as age increases) at a configurable geometric rate a. Increasing a allows the constructed histogram to respond more rapidly to changes in the underlying demand process. In other words, the weighting of the IA and/or RS histograms enables adaptation of the control levels (s, S) over time, so as to make the inventory system respond to changing demand patterns in a cost-effective manner that maintains good customer service (e.g., minimal backorders for inventory investment).

More particularly, at 101a, 101b, the cost function 600 uses histograms built from observed requisition sizes 304 and inter-arrival times 302. Stationarity of the requisition size and inter-arrival time distributions can be assumed, but the real demand process can change over time. The process 2 for building histograms can take this into account.

A process 2 based on simple forecasting techniques allow the histograms to give greater weight to more recent data, and therefore adapt more quickly to a changing demand process. The process 2 is as follows, given a smoothing constant a (which represents the decay rate per month; the best value for our data set was 0.05, which corresponds closely with the smoothing constant value that works best with simple exponential smoothing forecasts):

---
Histogram Smoothing Process 2:

Input: A set of observations (either requisition sizes
or inter-arrival times), smoothing constant a giving
the rate of weight decay per month.
Output: A weighted histogram.
    1.    Initalize H as an empty histogram, total = 0.
    2.    For each observation x of age t (in months):
        a. Let weight = $(1 − a)^t$.
        b. Add a weight to bucket x of H.
        c. Let total = total + weight.
    3.    Normalize the histogram by dividing each
        bucket by total.
---

This process 2 can reduce to the usual histogram-building procedure in the case where a has a value of 0, but puts greater weight on more recent data otherwise.

While the process 2 might not adapt immediately to discontinuous shifts in the demand distribution, it does provide more rapid adjustment to changes in inter-arrival time or demand size frequency distributions than does the basic method, whose adaptive behavior relies on the oldest data dropping out of the lookback interval used to build the histograms. It could be argued that efforts to handle discontinuous shifts in the demand distribution (for example, a sudden drop of 90% in average requisition value) are actually harmful—some of the issues with forecasting methods that the embodiments avoid are over-reaction to recent data and false trend or seasonality detection.

At 102a, 102b, histograms are created by summing the weights of observations with identical (substantially identical) quantities, and finally normalizing by the total weight of all observations, where Notations 1 and 2 are definable.

Figure 5:
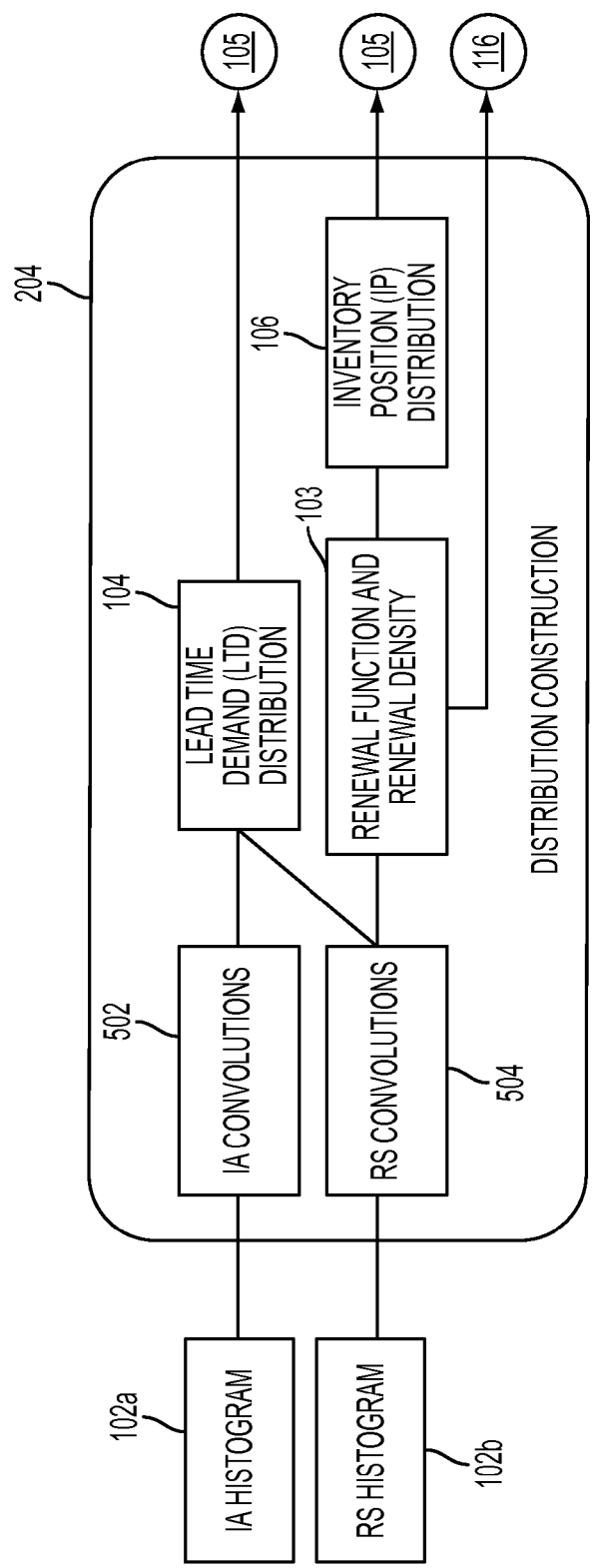
FIG. 5 is a flow diagram for constructing distributions for lead time demand (LTD) and inventory position (IP), according to an embodiment of the invention.

FIG. 5 is a flow diagram for constructing distributions for lead time demand (LTD) 104 and inventory position (IP) 106, according to an embodiment of the invention. Given IA and RS histograms 102a, 102b, the method constructs distributions for lead time demand (LTD) 104, and for the inventory position (IP) 106 associated with a particular set of levels (s, S).

Inventory Position 106:

Sahin treats demand sizes as continuous, so that the equilibrium (after the system has reached steady-state) inventory position $I_p$, a random variable, takes on values in the half-open interval (s, S]. As soon as the inventory position satisfies $I_p \leq s$, an order is placed, bringing the inventory position back to S. In contrast, in the invention, demand sizes are treated as discrete, so that $I_p = s+1, s+2, \ldots, S$. This leads to the following probability distribution for the equilibrium inventory position:

$$Pr(I_p = S) = \frac{1}{1 + R(\Delta - 1)} \quad \text{Eq. (D1)}$$

$$Pr(I_p = k) = \frac{r(S - k)}{1 + R(\Delta - 1)}.$$

Renewal Function and Renewal Density 103:

Here $\Delta = S - s$, $r(k)$ is the renewal density for demand sizes, and $R(k)$ is the renewal function of demand sizes. Note that this differs from the equation for the inventory position probabilities in Sahin, in that $\Delta$ is replaced by $\Delta - 1$, owing to the discrete nature of the demand sizes in the embodiments of the invention. Since the renewal density and renewal function of demand sizes respectively are $$r(k) = \sum_{n=1}^{k} b_n(k) \quad \text{Eq. (D2)}$$

$$R(k) = \sum_{n=1}^{k} r(n),$$

it can be observed that the equilibrium probabilities of the inventory position in Equation (D1) can be computed from the item demand size data. We also define $r(0)=1$ and $R(0)=0$. As the terms of the sums in Equation (D2) are all non-negative, we see that $r(k)$ and $R(k)$ are non-decreasing functions of k, and that the inventory position probabilities are non-increasing for $s < k < S$.

Leadtime Demand 104:

According to Sahin the equilibrium leadtime demand D has a density given by:

$$g(y) = \frac{1}{\mu_a} \sum_{k=1}^{\infty} b_k(y) \int_0^L [1 - A(u)][A_{k-1}(L-u) - A_k(L-u)] du, \quad \text{Eq. (D3)}$$

$$y > 0;$$

$$g(0) = \frac{1}{\mu_a} \int_0^{\infty} [1 - A(u+L)] du$$

The summation in Eq. (D3) is only formally infinite so that it agrees with Sahin; $b_k(y) = 0$ for $y > k$, as the sum of k demands' quantities cannot exceed k.

So the leadtime demand probabilities are computed from the interarrival time probabilities 502 and the demand size probabilities 504. A convenient notation is $g(y)=0$, $y<0$ to reflect that leadtime demand cannot be negative, and to simplify the derivation of the cost functions.

According to Sahin the equilibrium inventory position $I_p$ and the equilibrium leadtime demand D are independent random variables.

Therefore, the embodiments of the invention follow a renewal theoretic approach, for example, discussed in Sahin, I. "On the Stationary Analysis of Continuous Review (s, S) Inventory Systems," *Operations Research*, Vol. 27, 1979, pp 717-729, but uses the empirical histograms constructed from the demand history. Relative to prior art methods, embodiments of the invention remove as many mathematical assumptions (e.g., removes random variables based upon theoretical probability distributions) as possible. In particular, the actual distribution of inventory positions of items may not be uniform, so the assumptions can introduce significant errors. To this end according to embodiments of the invention:

1. The renewal functions and renewal densities, for demand sizes are computed directly from the empirical histograms, and could optionally be computed for demand inter-arrival times.

2. The renewal functions and renewal densities, for both the demand inter-arrival times and the demand sizes, are computed substantially similarly (but may be configured to use approximations for higher-order convolutions).

3. The distribution for lead time demand (LTD) and/or the inventory position (IP) are computed from the probability distributions based upon the empirical histograms.

The process of constructing the distributions for LTD and IP can be similar for each distribution, although the formulas (derived, for example, in Sahin, I. "On the Stationary Analysis of Continuous Review (s, S) Inventory Systems," *Operations Research*, Vol. 27, 1979, pp 717-729) used for each distribution differ. Given a histogram, the histogram is regarded as the probability distribution for a single observation, and at 502, 504 can compute N-fold convolutions (giving the distribution for the sum of N observations). The system can be configured to approximate the convolution by a normal distribution for large values of N. For the demand process, the convolutions are used to compute the renewal functions (for demand sizes and optionally for demand inter-arrival times) and to compute the renewal densities (for demand sizes and optionally for demand inter-arrival times), thereby the renewal functions and the renewal densities are used in conjunction with the convolutions to substantially exactly compute the LTD and IP distributions.

Figure 6:
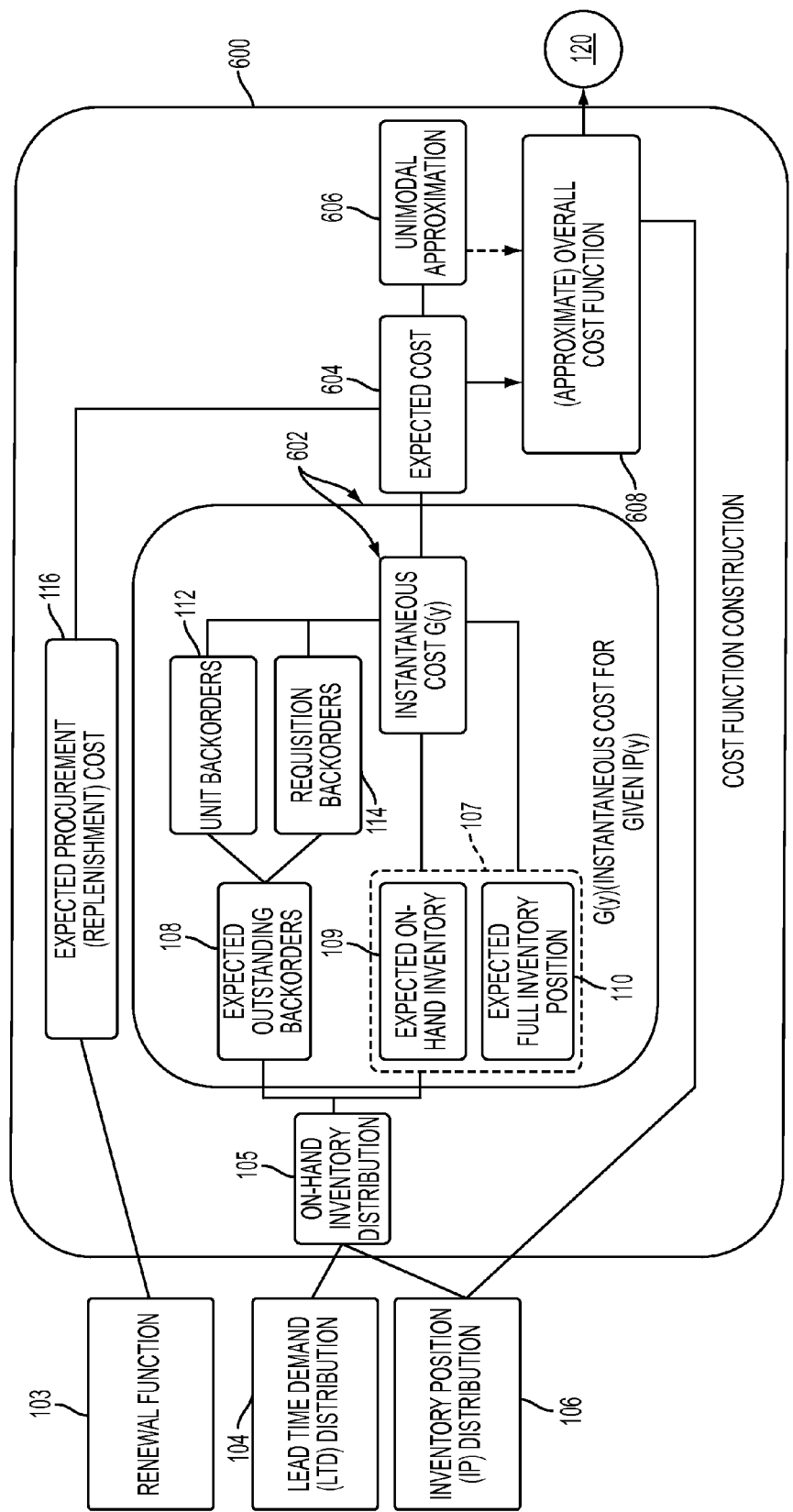
FIG. 6 is a flow diagram for construction of a cost function, according to an embodiment of the invention.

FIG. 6 is a flow diagram for construction of a cost function to obtain inventory control levels (s, S), according to an embodiment of the invention. According to an embodiment of the invention, a cost function is used with several improvements over the prior art, such as Sahin, I. "On the Stationary Analysis of Continuous Review (s, S) Inventory Systems," *Operations Research*, Vol. 27, 1979, pp 717-729). The improvements, some of which result from the input processes outlined above, according to the embodiment of the invention are:

1. The use of a LTD distribution based directly on the observed (actual or empirical) requisition sizes and inter-arrival times (i.e., an LTD distribution based upon the IA and/or RS histograms generated as discussed for FIGS. 4 and 5).

2. The use of an IP distribution based directly on the observed (actual or empirical) requisition sizes (i.e., an IP distribution based upon the RS histogram generated as discussed for FIGS. 4 and 5).

3. The cost function can include a term for expected outstanding requisition backorders. Prior art is in terms of outstanding unit backorders, which cannot be used to provide an accurate cost when the entire requisition must be satisfied. Penalizing for expected outstanding requisition backorders also reduces the likelihood of overinvestment in a few inventory items or conversely a lack of balance across the inventory item population that leads to underinvestment in majority of items, due to many large requisition size observations. The calculations for expected outstanding requisition backorders can be based on, for example, Kruse, W. Karl, "Waiting Time in a Continuous Review (s, S) Inventory System with Constant Lead Times," *Operations Research*, Vol. 29, No. 1 (1981).

4. The cost function can include a term penalizing the full inventory position, which reduces the likelihood of overinvestment in the case of changes in the demand process. Prior art is in terms of only the on-hand investment, and additionally makes assumptions about the demand process to help simplify the on-hand investment distribution.

5. The cost function maintains the properties needed for efficient optimization using, for example, the Zheng-Federgruen algorithm (see Zheng, Y. and Federgruen, A. "Finding Optimal (s, S) Policies is About as Simple as Evaluating a Single Policy", *Operations Research*, Vol. 39, 1991, pp. 654-665; and Zheng, Y. and Federgruen, "Errata: Finding Optimal (s, S) Policies is about as Simple as Evaluating a Single Policy," *Operations Research*, Vol. 40, 1992, p. 192.).

The embodiments compute an (s, S) for each item in the inventory so that the total expected cost per unit time, including ordering, holding, and backorder costs, are minimized when summed across inventory items. The difference between existing logistics systems' cost function and the embodiments cost function is the way in which the expected ordering, holding, and backorder costs are computed for an inventory item, per unit time. Each of these three expected cost terms of ordering, holding and backorder depends on the (s, S) that have been selected. In other words, each inventory item has an expected cost for ordering, holding and backorders, for each choice of the upper and lower control levels. So, if the lower control level is −3 and the upper control level is 8, then for that choice the computer system 100 computes at 170 an expected cost for each of these three cost terms of ordering, holding and backorder.

Overview of the process of computing the expected cost terms to obtain the inventory control levels (s, S) in FIG. 6: From demand history data at 103, 104, 106, the Sahin's total cost function is constructed at 604 ("objective function"), to be minimized as a function of (s, S), where s is the ROP and S is the RO. This objective function is not immediately in a form amenable to applying the Zheng-Federgruen (Z-F) optimization algorithm at 120. According to an aspect of an embodiment of the invention, the Sahin objective function is recast into a form that makes application of the Z-F algorithm at 120 possible, where sufficient conditions for the Z-F algorithm to succeed are satisfied.

In FIG. 6, according to an aspect of an embodiment, the computer system 100 at 602 establishes G(y) (Eq. (A1)), which is the instantaneous cost for a current inventory position (IP) (y) a lead time in future (expected future cost) including cost terms of expected backorders 108 and carrying inventory 107. More particularly, G(y) includes the cost of carrying inventory at 107, which includes the cost of carrying (holding) inventory conditioned on current IP (y) at 109 and the cost of carrying full inventory position a constant lead time out in the future at 110, and cost of inventory backorders conditioned on current IP (y) at 108 that includes expected cost of unit backorders 112 and expected requisition backorders 114. According to an aspect of an embodiment, at 602, optionally the instantaneous cost for a current IP (y) (i.e., G(y)) can be used to search for all, substantially all, and/or at 120 for one or more, possible control level pairs (s, S) on an inventory item basis.

In FIG. 6, at 604 an overall expected cost for on-hand inventory is established as a function of control levels (s, S) that minimize the cost per unit time for inventory item holding (carrying) 107 (109, 110), backorders 108 and further including inventory ordering (replenishment) 116, or any combinations thereof. According to an aspect of an embodiment, at 604 the computer system 100 could search across all, substantially all, and/or at 120 one or more, possible control level pairs (s, S) on an inventory item basis to obtain a resulting cost among the four cost terms of expected inventory ordering (expected procurement or replenishment) 116, cost of carrying inventory, namely expected on-hand inventory conditioned on IP (y) 109 and expected full IP a constant lead time out in the future 110, and expected outstanding inventory backorders conditioned on IP (y) 108, namely unit back orders 112 and requisition backorders 114.

According to an aspect of an embodiment, the computer system 100 computes at 608 an overall cost function by averaging the instantaneous cost of back orders (108) and carrying inventory (107) across the probability distribution for the (IP) (106), namely based upon (a) two or more of the three inventory item cost components of expected cost of ordering 116, and instantaneous expected costs of holding (carrying) inventory conditioned on a current inventory position (IP) (y) 107, which can include expected on-hand inventory conditioned on a current IP (y) 109 and/or expected cost of on-hand inventory 109 and expected cost of full inventory position a constant lead time out in the future 110, and/or instantaneous costs of expected outstanding backorders 108, which can include expected unit backorders 112 and/or expected requisition backorders 114, and (b) inventory position (IP) distribution 106. According to an aspect of an embodiment of the invention, 608 may further include a unimodal approximation 606 to the average of the instantaneous cost depending on utilization of a performance metric (cost) that does not meet a condition of an optimization process.

FIG. 6 is described in more detail.

In FIG. 6, at 105, the on-hand inventory distribution is computed. Using the fact that I=$I_p$–D, the independence of $I_p$ and D (because of the steady-state assumption), and Equation (D1), we have the following probability distribution for the on-hand inventory, using discrete demand sizes:

$$Pr(I = k) = \sum_{j=0}^{\Delta-1} Pr(I_p = S - j, D = S - j - k) \quad \text{Eq. (D4)}$$

$$= \sum_{j=0}^{\Delta-1} Pr(I_p = S - j) Pr(D = S - j - k)$$

$$= \sum_{j=0}^{\Delta-1} \frac{r(j)}{1 + R(\Delta - 1)} g(S - j - k)$$

$$= \frac{1}{1 + R(\Delta - 1)} \sum_{j=0}^{\Delta-1} r(j) g(S - j - k), \, k \le S.$$

Note that in the terms of the sum where j>S−k, we have g(S−j−k)=0. The reason we put Δ−1 as the upper limit of summation is that we will require it to be independent of k so that we may reverse the order of summation in Eq. D6.

These on-hand probabilities at 105 enable us to compute the expected on-hand inventory and expected backorders, and from these we can compute the costs of holding stock and of expected backorders.

To compute the expected cost to order, at 116, the cycle length for the inventory position, where a cycle is the time between successive restorations of the inventory position to S is required. The expected cycle length is $\mu_a[1+R(\Delta-1)]$. This is from Sahin as adapted to the discrete demand size case. From this it can be shown, (see Ross, S. M., "*Applied Probability Models with Optimization Applications*," Dover, Mineola, N.Y., 1992), that the expected number of cycles per unit time is $$\frac{1}{\mu_a[1 + R(\Delta - 1)]},$$

which is also the expected number of orders per unit time. Note that 1+R(Δ−1) is the expected number of demands between reorder point trips.

In FIG. 6, regarding the instantaneous cost for a given inventory position (IP) (y) at 602, the Zheng-Federgruen (Z-F) paper does not discuss the Sahin cost function, so we show how that cost function can be reformulated to make it amenable to Z-F optimization. We will use K as the fixed cost to order, h as the holding cost factor, applied to expected positive on-hand inventory (some other models apply it to the inventory position), and p to be the backorder penalty cost, applied to the expected negative on-hand inventory. The backorder penalty p is the link between one-item problems and the multi-item problem—it is also known as the shadow price or Lagrange multiplier. Denote positive on-hand inventory by $I^+$ and negative on-hand inventory (backorders) by $I^-$.

Using the notation of Z-F, let c(s, S) be the expected cost per unit time when the system is in equilibrium. We have $$c(s, S) = \frac{K}{\mu_a[1 + R(\Delta - 1)]} + hE(I^+) - pE(I^-) \quad \text{Eq. (D5)}$$

The first term is immediate from the expected orders per unit time that we found in the section Inventory Cycles; we turn to the second and third terms. From the definition of expectation and Equation (D4), we have $$E(I^+) = \sum_{k=1}^{S} k Pr(I^+ = k) \quad \text{Eq. (D6)}$$

$$= \sum_{k=1}^{S} k \sum_{j=0}^{\Delta-1} \frac{r(j)}{1 + R(\Delta - 1)} g(S - j - k)$$

$$= \frac{1}{1 + R(\Delta - 1)} \sum_{j=0}^{\Delta-1} r(j) \sum_{k=1}^{S} k g(S - j - k)$$

$$= \frac{1}{1 + R(\Delta - 1)} \sum_{j=0}^{\Delta-1} r(j) \sum_{k=1}^{S-j} k g(S - j - k)$$

Define $$H(y) = h \sum_{k=1}^{y} k g(y - k) \text{ for } y \ge 1, \, H(y) = 0 \text{ otherwise,} \quad \text{Eq. (D7)}$$

and substitute this into Equation (D6), obtaining $$hE(I^+) = \frac{1}{1 + R(\Delta - 1)} \sum_{j=0}^{\Delta-1} r(j) H(S - j). \quad \text{Eq. (D8)}$$

By algebra nearly identical to that used deriving Equation (D6), the following is obtained:

$$E(I^-) = \frac{1}{1 + R(\Delta - 1)} \sum_{j=0}^{\Delta-1} r(j) \sum_{k=-1}^{-\infty} k g(S - j - k). \quad \text{Eq. (D9)}$$

Set $$P(y) = p \sum_{k=1}^{\infty} k g(y + k), \quad \text{Eq. (D10)}$$

and substitute this into Equation (9), obtaining $$-pE(I^-) = \frac{1}{1 + R(\Delta - 1)} \sum_{j=0}^{\Delta-1} r(j) P(S - j) \quad \text{Eq. (D11)}$$

Note that H(y) and P(y) are defined for all integers y, using our notational convention that g(x)=0, x<0. Here y is the inventory position, which may take on negative as well as positive values when s<−1. Now define $$G(y) = H(y) + P(y) \quad \text{Eq. (D12)}$$

Note that G here is not the CDF of g, the leadtime demand density, but is analogous to the G used by Z-F.

Substituting the results of Equations (D8) and (D11) into Equation (D5), and using Equation (D12), provides:

$$c(s, S) = \frac{\frac{K}{\mu_a} + \sum_{j=0}^{\Delta-1} r(j)\left[h\sum_{k=1}^{S} kg(S-j-k) - p\sum_{k=-\infty}^{-\infty} kg(S-j-k)\right]}{1 + R(\Delta - 1)}$$

$$= \frac{1}{1 + R(\Delta - 1)}\left\{\frac{K}{\mu_a} + \sum_{j=0}^{\Delta-1} r(j)[H(S-j) + P(S-j)]\right\}$$

$$= \frac{1}{1 + R(\Delta - 1)}\left\{\frac{K}{\mu_a} + \sum_{j=0}^{\Delta-1} r(j)G(S-j)\right\}$$

Eq. (D13)

Now define $m(k) = r(k), k \geq 0$ $M(0) = 0$ $M(k) = 1 + R(k-1), k \geq 1$      Eq. (D14)

and substitute this into Equation (D13), yielding $$c(s, S) = \frac{1}{M(\Delta)}\left\{\frac{K}{\mu_a} + \sum_{j=0}^{\Delta-1} m(j)G(S-j)\right\}$$

$$= \frac{1}{M(S-s)}\left\{\frac{K}{\mu_a} + \sum_{j=0}^{S-s-1} m(j)G(S-j)\right\}.$$

Eq. (D15)

Except for the presence of $\mu_a$ in the denominator of the cost-to-order term, this is compatible with Z-F.

Therefore, in FIG. 6, at 602, the instantaneous cost for a given IP (y), denoted G(y), involves the sum of several terms diagrammed in FIG. 6. G(y) at 602 represents the expected instantaneous cost of holding inventory from 109 and 110 and the expected cost of outstanding backorders from 108. Note that the overall expected cost of a given IP does not include the procurement cost from 116, which is of a different form from the other cost terms. The overall expected cost for a given IP y at 602 is defined by refining the original expression in Eq. (D12) to capture two different holding costs, and two different backorder costs:

$$G(y) = H(y) + H_{IP}(y) + P_u(y) + P_r(y) \qquad (A1)$$

Each of H(y) and $H_{IP}(y)$ as well as $P_u(y)$ and $P_r(y)$ is the instantaneous cost function (or at a point in time) for various values of inventory positions (y), thereby each of the four cost terms H(y), $H_{IP}(y)$, $P_u(y)$ and $P_r(y)$ being an instantaneous rate of incurring costs a lead time in the future, as opposed to an average rate of incurring costs over time. However, the four cost terms H(y), $H_{IP}(y)$, $P_u(y)$ and $P_r(y)$, or a unimodal approximation to their sum at 606, are subsequently usable at 608 to obtain an overall cost function by averaging over all, substantially all, and/or one or more possible inventory positions (y), where by averaging the instantaneous costs across, for example, all feasible values of the inventory position (y) 106, the overall cost of holding on-hand and/or total (full onhand inventory in equilibrium) inventory, and of unit and/or requisition backorders, are computed. According to an aspect of an embodiment, any combinations of one or more of the cost terms H(y), $H_{IP}(y)$, $P_u(y)$ and $P_r(y)$ can be used. According to an aspect of an embodiment, the sum of H(y), $H_{IP}(y)$, $P_u(y)$ and $P_r(y)$ may be approximated by a unimodal function at 606, prior to averaging across the possible inventory positions at 608, depending on utilization of a performance metric (cost) that does not meet a condition of an optimization process.

H(y) and $H_{IP}(y)$ represent the instantaneous holding cost (instantaneous cost of holding inventory) applied to on-hand inventory at 109 and the full inventory position (i.e. onhand inventory in equilibrium) at 110, respectively. Onhand inventory refers to just work on hand (e.g., inventory items on the shelf or in stock) that is positive; if onhand inventory is negative then there could be backorders.

The $H_{IP}(y)$ is a full inventory position penalty term, the purpose of which is to discourage the optimization from investing too heavily in large replenishment orders for a few items, depriving the system of funds needed for the remainder of the item population.

In addition, according to an aspect of an embodiment of the invention, $P_u(y)$ and/or $P_r(y)$ can be provided, which represent the instantaneous outstanding backorder cost for unit backorders at 112 and requisition backorders at 114, respectively. In Equation (A1), each of the four terms involves a separate multiplicative cost factor that can be tuned to adjust the relative importance of each term; typical values are described below.

The instantaneous inventory holding cost applied to the full inventory position is $$H_{IP}(y) = iy, y \geq 0 \qquad (A2),$$

where i is a parameter specifying a cost to hold a single item in dollars per unit time. The value of i is generally set to 5-20% of the item unit price per year, although it may be set to zero if inventory holding cost is applied only to (only includes) on-hand inventory H(y).

The instantaneous on-hand inventory holding cost term is given by Equation (A3), which is $$H(y) = h\sum_{k=1}^{y} kg(y-k) \text{ for } y \geq 1, H(y) = 0 \text{ otherwise,} \qquad (A3)$$

where g(x) is the lead time demand probability mass function and h is a cost term of the same form as i, although generally set to a slightly higher value.

The unit backorder term $P_u$ from 112 is $$P_u(y) = p\sum_{k=1}^{\infty} kg(y+k). \qquad (A4)$$

Here p is the cost per outstanding backordered unit per unit time. The value of p is usually around 10-100 times the unit price, although it may be set to zero if expected outstanding backorders cost is applied only to outstanding requisition backorders 114.

Finally, the requisition backorder term $P_r$ is $$P_r(y) = \begin{cases} p'E[O_r|y], & \text{if } y \geq 0 \\ p'(E[O_r|y=0] + 1 + R(-y-1)), & \text{otherwise,} \end{cases} \qquad (A5)$$

where $E[O_r|y]$ is the expected number of outstanding requisition backorders (conditioned on the inventory position y), R is the renewal function for demand sizes, and p' is the cost per outstanding requisition per unit time. In the case of y<0, the additional term 1+R(−y−1) is counting the expected number of backordered requisitions that were first backordered more than a lead time ago, while the $E[O_r|y=0]$ term counts the requisitions that are backordered during the last lead time. The parameter p' is often allowed to vary more than the other parameters—tuning p' is the usual method for targeting a particular investment level. The value of p' can range from 50 to 10,000 times the unit price. For $y \geq 0$, $E[O_r|y]$ can be expressed in terms of the requisition size and inter-arrival time distributions as:

$$E[O_r(t) | y] = \sum_{n=1}^{\infty} (1 - B_n(y)) \frac{1}{\mu_A} A_{n-1} * (1 - A)(L). \quad (A6)$$

The purpose of the requisition backorder cost 114 is to penalize backordered requisitions without regard to the number of units backordered. This can provide a more even distribution of inventory investment across items that have small demand sizes (items requested by operational customers or small retailers) and large demand sizes (items requested by large retail or industrial customers, such as an overhaul facility, a depot, etc.).

According to an aspect of an embodiment, at 120 instead of searching for substantially all possible inventory control level pairs (s, S), a particular pair and/or subset of pairs of the little/big (s, S) can be selected according to criteria to identify one or more inventory control pairs of (s, S) that minimizes the cost per unit time for ordering 116, holding 109, 110, or backorder 108 (112, 114), or any combinations thereof. For example, at 120, the searching for inventory control levels (s, S) that results in a minimum cost is according to Zheng-Federgruen optimization that can accommodate discrete empirical demand data based upon the embodiments of the invention.

More particularly, the inclusion of requisition backorders 114 into a Sahin cost function is based upon the expected outstanding requisition back orders 114 including expected requisition wait time as follows:

Expected Requisition Wait Time:

Let $w_j$ and $W_j$ be the steady-state probability density function (PDF) and cumulative density function (CDF), respectively, for the wait time for the jth unit demanded in a single requisition. is $$W_j(\tau) = \sum_{a=s+1}^{S} P(I_p = a) G_\tau(a - j), \quad \text{Eq. (E1)}$$

where $g_\tau$ is the PDF for steady-state cumulative demand in the time $[t-(L-\tau), t)$, given that a demand occurs at time t, and $G_\tau$ is the corresponding CDF:

$$g_\tau(x) = P(d(t - (L - \tau), t) = x | \text{demand at time } t) =$$
$$\sum_{k=0}^{\infty} b_k(x)(A_k(L - \tau) - A_{k+1}(L - \tau)), x \geq 0,$$

$$G_\tau(x) = \sum_{k=0}^{\infty} B_k(x)(A_k(L - \tau) - A_{k+1}(L - \tau)).$$

Here the convention used is that for any density, f, $f_0$ is the delta function (so the CDF $F_0(x)=1$ for all $x \geq 0$).

The expected requisition wait time $T_r$ is determined from $W_j$:

$$E[T_r] = \sum_{n=1}^{\infty} b(n) \sum_{\tau=0}^{\infty} (1 - W_n(\tau)).$$

Expected outstanding requisition backorders:

Little's theorem can be applied to get the expected outstanding requisitions:

$$E[O_r] = E[T_r]/\mu_A.$$

To add the correct term to the G component of the cost function, the expectation of $O_r$ conditioned on a given value of $I_p$ is taken into account. Conditioning on $I_p$ and the requisition size d(t) gives:

$$E[O_r | I_p = y \text{ and } d(t) = n] = \frac{1}{\mu_A} \sum_{\tau=0}^{\infty} (1 - G_\tau(y - n)).$$

Roughly, this is because, given that $I_p(t-(L-\tau))=y$, a requisition of size n at time t is completely filled by time t+τ if and only if at most y-n units were demanded in the interval $[t-(L-\tau), t)$. Conditioning on $I_p(t-(L-\tau))=y$ does not depend on τ in the steady-state (a better derivation appears later). Hence, removing the conditioning on the requisition size, $$E[O_r | I_p = y] = \frac{1}{\mu_A} \sum_{n=1}^{\infty} b(n) \sum_{\tau=0}^{\infty} (1 - G_\tau(y - n)).$$

This expression can be considerably simplified by substituting in for G and rearranging a number of sums:

$$E[O_r | I_p = y] = \frac{1}{\mu_A} \sum_{n=1}^{\infty} b(n) \sum_{\tau=0}^{\infty} \sum_{k=0}^{\infty} (1 - B_k(y - n))$$
$$(A_k(L - \tau) - A_{k+1}(L - \tau))$$

$$= \frac{1}{\mu_A} \sum_{k=0}^{\infty} \left( \sum_{n=1}^{\infty} b(n)(1 - B_k(y - n)) \right)$$
$$\left( \sum_{\tau=0}^{\infty} (A_k(L - \tau) - A_{k+1}(L - \tau)) \right)$$

$$= \frac{1}{\mu_A} \sum_{k=0}^{\infty} (1 - B_{k+1}(y)) A_k * (1 - A)(L)$$

$$= \frac{1}{\mu_A} \sum_{k=1}^{\infty} (1 - B_k(y)) A_{k-1} * (1 - A)(L)$$

Now note the similarity between $E[O_r|I_p=y]$ and the lead time distribution function, which (for $x>0$) can be written as $$G_{LTD}(x) = \frac{1}{\mu_A} \sum_{k=1}^{\infty} B_k(x)(A_{k-1} - A_k) * (1 - A)(L).$$

Direct derivation:

The simpler expression for $E[O_r|I_p=y]$ is explained as follows. Note that $$\frac{1}{\mu_A}A_{k-1}*(1-A)(L)$$

is the probability of observing k requisitions or more in a lead time; conditioning on the number of requisitions in a lead time is established. This also allows a cleaner derivation than the one mentioned above, since it is mostly or always explicitly conditioning on $I_p(t-L)$ and do not have any wait times to become complicated. If $y \geq 0$, $$E[O_r(t)|I_p(t-L)=y] = \sum_{k=1}^{\infty} P(k\ reqs)E[O_r|I_p=y\ \text{and}\ k\ reqs] \quad \text{Eq. (E2)}$$

$$= \sum_{k=1}^{\infty} P(k\ reqs) \sum_{n=1}^{k} P(nth\ req\ \text{cumulatively exceeds}\ y)$$

$$= \sum_{n=1}^{\infty} P(nth\ req\ \text{cumulatively exceeds}\ y) \sum_{k=n}^{\infty} P(k\ reqs)$$

$$= \sum_{n=1}^{\infty} (1-B_n(y))\frac{1}{\mu_A}A_{n-1}*(1-A)(L).$$

If y<0, then there are outstanding backorders remaining at time t from those present at time t-L. At time t, z=-y units backordered can be attributed to orders prior to t-L. The number of requisitions involved is (with $D_i$, i=1, 2, . . . , the requisition sizes, working backwards in time from the last requisition before t-L)

$$N_x(z) = \inf\left\{m>0: \sum_{i=1}^{m} D_i \geq z\right\} \quad \text{Eq. (E3)}$$

$$= 1 + \sup\left\{m>0: \sum_{i=1}^{m} D_i < z\right\}$$

$$= 1 + N(z-1).$$

Hence there are 1+R(-y-1) additional expected outstanding requisitions when y<0, where R is the renewal function for the demand process, for a total of $1+R(-y-1)+E[O_r|I_p(t-L)=0]$.

The Zheng-Federgruen Conditions at 120 are described. The cost functions c(s, S) and G(y) from 602, 608 respectively, satisfy sufficient conditions for the Z-F algorithm to apply at 120.

Equation D15 is of the same form as a corrected Z-F cost function, but still need to verify that the functions c(s, S), G(y), M(k), and m(k) satisfy the conditions for the Z-F optimization to apply. First note that we can compute M(k) and m(k) directly from the renewal density and renewal function of demand sizes, given by our Equation (D2).

Need to show that -G(y) is unimodal, i.e. there exists an x such that -G(y) is monotonically increasing for $y \leq x$ and -G(y) is monotonically decreasing for $y \geq x$. Also need to show that $$\lim_{|y|\to\infty} G(y) > \min_y G(y) + K. \quad \text{Eq. (D16)}$$

In other words, when a requisition backorder term 114 and/or $H_{IP}(y)$ (full inventory position 110) is used in G(y), as in Equation A1, a unimodal approximation to G(y) is performed at 606.

If neither term is used, G(y) is of the form in Eq. (D12), and it can be shown that the original G(y) is unimodal in this case. First, it is shown -G(y) is unimodal. Considering the first difference of G, we have $$G(y+1) - G(y) = H(y+1) + P(y+1) - \quad \text{Equation (D17)}$$

$$H(y) - P(y)$$

$$= H(y+1) - H(y) +$$

$$P(y+1) - P(y).$$

Working with H first provides $$H(y+1) - H(y) = h\sum_{k=1}^{y+1} kg(y-k+1) - h\sum_{k=1}^{y} kg(y-k) \quad \text{Eq. (D18)}$$

$$= h\sum_{k=0}^{y} (k+1)g(y-k) - h\sum_{k=1}^{y} kg(y-k)$$

$$= h\sum_{k=0}^{y} g(y-k) = h\sum_{j=0}^{y} g(j)$$

$$= hPr(D \leq y).$$

The first difference for P is $$P(y+1) - P(y) = -p\sum_{k=-1}^{-\infty} kg(y-k+1) + \quad \text{Eq. (D19)}$$

$$p\sum_{k=-1}^{-\infty} kg(y-k)$$

$$= -p\sum_{k=-2}^{-\infty} (k+1)g(y-k) +$$

$$p\sum_{k=-1}^{-\infty} kg(y-k)$$

$$= -p\sum_{k=-1}^{-\infty} g(y-k)$$

$$= -p\sum_{j=y+1}^{\infty} g(j)$$

$$= -p[1 - Pr(D \leq y)]$$

Putting Equations (D18) and (D19) into Equation (D17), provides:

$$G(y+1)-G(y)=hPr(D\leq y)-p[1-Pr(D\leq y)]=(h+p)Pr$$
$$(D\leq y)-p9 \quad \text{Eq. }(D20)$$

From Equation (D20) it can be seen that the first difference for G is negative for y≤−1. (For this to be possible negative values of s can be considered.) Also since Pr(D≤y)→1 as y→∞, it can be seen that G(y+1)−G(y)→h>0. Therefore for sufficiently large y, the first difference is positive. But Pr(D≤y) is non-decreasing, so G(y+1)−G(y) is also non-decreasing and can change sign at most once. It can now be observed that G changes sign, so there exists an x (not generally unique) such that G(y+1)−G(y)≤0 for y<x and G(y+1)−G(y)≥0 for y>x. Thus G is monotone decreasing (not necessarily strictly) for y<x and G is monotone increasing for y>x. This shows that −G(y) is unimodal.

Limiting Behavior:

Next it can be shown that G has the correct limiting behavior as |y|→∞. First consider the case of G(y) defined by Eq. (D12). First note that any x that works in the discussion of unimodality above is a point where G takes on its minimum, so that minimum exists. The limiting behavior of H and P can be investigated separately, where those are as in Eq. (D7) and (D10), as follows:

$$\lim_{y\to\infty} H(y) = \lim_{y\to\infty} h\sum_{k=1}^{y} kg(y-k) \quad \text{Eq. (D21)}$$

$$= \lim_{y\to\infty} h\left\{\begin{array}{l}g(y-1)+g(y-2)+\ldots+g(0)+ \\ g(y-2)+\ldots+g(0)+\ldots+g(0)\end{array}\right\}$$

$$= \lim_{y\to\infty} h\sum_{k=0}^{y-1} Pr(D \le k).$$

Now as already observed, Pr(D≤y)→1 as y→∞, so for any ε>0, an N>0 can be found such that for all y>N we have Pr(D≤y)>1−ε. So for all y>N+1:

$$\sum_{k=0}^{y-1} Pr(D \le k) = \sum_{k=0}^{N} Pr(D \le k) + \sum_{k=N+1}^{y-1} Pr(D \le k) > \quad \text{Eq. (D22)}$$

$$\sum_{k=0}^{N} Pr(D \le k) + (y-N-1)(1-\varepsilon).$$

Letting y→∞, it can be seen that the last term in Equation (D22) tends to infinity, and applying this to Equation (D22) it can be seen that $$\lim_{y\to\infty} H(y) = \infty. \quad \text{Eq. (D23)}$$

On the other hand, for all integers y<1 we have H(y)=0, so $$\lim_{y\to-\infty} H(y) = 0 \quad \text{Eq. (D24)}$$

Now consider the limiting behavior of P as follows:

$$P(y) = -p\sum_{k=-1}^{-\infty} kg(y-k) \quad \text{Eq. (D25)}$$

$$= p\sum_{k=1}^{\infty} kg(y+k)$$

$$= p\left\{\begin{array}{l}Pr(D=y+1)+Pr(D=y+2)+\ldots+ \\ Pr(D=y+k)+\ldots+ \\ Pr(D=y+2)+\ldots+Pr(D=y+k)+\ldots+\ldots+ \\ Pr(D=y+k)+\ldots+\ldots\end{array}\right\}$$

$$= p\sum_{k=y+1}^{\infty} Pr(D \ge k)$$

But it can be observed that $$\sum_{k=1}^{\infty} Pr(D \ge k) = E(D) < \infty,$$

so for any ε>0 an N>0 can be found such that for all y>N:

$$\sum_{k=y+1}^{\infty} Pr(D \ge k) = \sum_{k=1}^{\infty} PR(D \ge y) - \sum_{k=1}^{y} Pr(D \ge y) < \varepsilon. \quad \text{Eq. (D26)}$$

Therefore $$\lim_{y\to\infty} P(y) = \lim_{y\to\infty} p\sum_{k=y+1}^{\infty} Pr(D \ge k) = 0. \quad \text{Eq. (D27)}$$

On the other hand, for y≤−1

$$P(y) = -p\sum_{k=y+1}^{\infty} Pr(D \ge k) \quad \text{Eq. (D28)}$$

$$= \sum_{k=y+1}^{0} Pr(D \ge k) + \sum_{k=1}^{\infty} Pr(D \ge k)$$

$$= \sum_{j=1}^{-y} 1 + E(D) = -y + E(D).$$

which provides:

$$\lim_{y\to-\infty} P(y) = \lim_{y\to-\infty} -y + E(D) = +\infty. \quad \text{Eq. (D29)}$$

Putting together Equations (D23) and (D27), provides:

$$\lim_{y\to\infty} G(y) = \lim_{y\to\infty} H(y) + \lim_{y\to\infty} P(y) = \infty + 0 = \infty, \quad \text{Eq. (D30)}$$

and from Equations (D24) and (D29), it can be provided:

$$\lim_{y\to-\infty} G(y) = \lim_{y\to-\infty} H(y) + \lim_{y\to-\infty} P(y) = 0 + \infty = \infty. \quad \text{(Eq. D31)}$$

From Equations (D30) and (D31), it is clear that Equation (D16) holds.

Now consider G(y) defined by Eq. (A1). In this case, the correct limiting behavior still holds, provided some conditions on the cost function parameters are met. Eq. (A1) is obtained from Eq. (D12) by adding the terms $H_{IP}(y)$ and $P_r(y)$. By definition, both new terms are nonnegative for all y, so their addition cannot cause G(y) to tend to a finite value. Hence the limit in either direction remains infinite, so the condition still holds.

$$G(y)=H(y)+H_{IP}(y)+P(y)+P_r(y) \qquad \text{Eq. (A1)}$$

602 can include any combination of one or more of the cost terms. According to an aspect of an embodiment other cost terms may be provided. In case G(y) includes a cost term that causes unimodality of the cost function 602 to be lost, for example, when $H_{IP}(y)$ and/or $P_r(y)$ are included, where the cost function 602 plot may be decreasing to a bottom and then increasing with further ups and down, then conditions for optimization may not be met. To maintain unimodality, where the cost function 602 plot decreases to a bottom and then increases without further significant ups and down (substantially flat to increasing), at 606 a unimodal approximation is applied to meet conditions for optimization.

For example, if the penalties applied to expected requisition backorders and/or expected inventory position are non-zero, then G(y) contains all four cost terms: $G(y)=H(y)+H_{IP}(y)+P_u(y)+P_r(y)$. In this case, G(y) may not be unimodal, and G(y) is approximated by a unimodal function in order for optimal levels to be found efficiently.

For example, ensuring correct optimization with the Zheng-Federgruen algorithm is a major computational issue when defining a cost function. As shown by the Limiting Behavior of the conditional cost function G(y), and the Cost Function Relationships, which expresses the cost function as a weighted sum of terms conditioned on inventory position, all necessary requirements are met with the exception of unimodality of the conditional cost function G(y).

If G(y) fails to be unimodal, the cause is usually the requisition backorder term (although it depends on the penalty weights and on the demand distribution). This can be seen by considering a simple constant demand rate of 1 requisition every period for a quantity of 10 units, where a cost is applied only to requisition backorders (and not unit backorders). In this case, G(y) will have local minima at both 0 and 10, since any positive stock less than 10 will incur holding cost but cannot help reduce requisition backorders.

Figure 7:
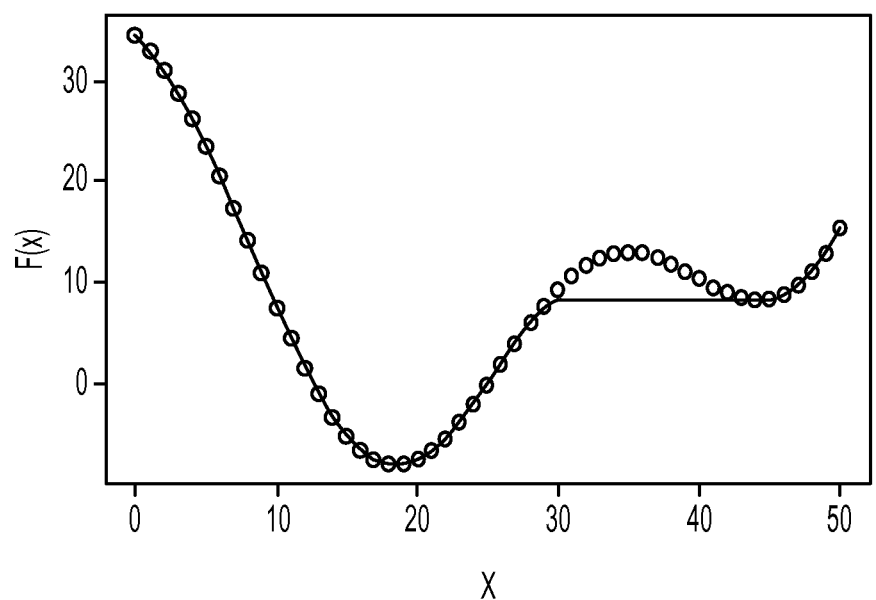
FIG. 7 is an example of a function and its unimodal approximation.

The cost function should be unimodal (having only one change from decreasing/constant to increasing/constant) in order for the optimization procedure to avoid being caught in a non-optimal local minimum. An example of a function and its unimodal approximation is shown in FIG. 7. In 606, prior to assembling the full cost function at 608 and optimization in 120, a unimodal approximation to the conditional cost function G(y) is made by flattening out the valleys corresponding to local minima before building the full cost function. Given a possibly non-unimodal function $f$ defined on $\{0, 1, 2, \ldots, N\}$ achieving a global minimum at $x=x_m$, we use the unimodal approximation $f_u$, defined on $\{0, 1, 2, \ldots, N\}$ by:

$$f_u(0) = f(0)$$

$$f_u(N) = f(N)$$

$$f_u(x) = \begin{cases} f(x), & \text{if } f(x) \le f_u(x-1) \\ f_u(x-1), & \text{otherwise} \end{cases} \quad \text{for } x \le x_m$$

$$f_u(x) = \begin{cases} f(x), & \text{if } f(x) \le f_u(x+1) \\ f_u(x+1), & \text{otherwise} \end{cases} \quad \text{for } x > x_m$$

When computing the unimodal approximation to G(y), the value of G(y) is first computed for a range of values of y, then the global minimum is determined, and finally the unimodal approximation is computed given the global minimum.

According to an aspect of an embodiment, the $H_{IP}(y)$ 110 and/or $P_r(y)$ 114 cost terms provide an example benefit of forcing a balance of investment across inventory items. In the case of the $P_r(y)$ term, this is because requisition backorders are penalized equally, for example, whether a backordered requisition is for one inventory item or 10,000 inventory items, thereby forcing the optimization search to provide more support for items with small demand sizes. In the case of the $H_{IP}(y)$ term, this is because large investments in the inventory position (on-hand plus due-in) for an individual item, typically due to large demand sizes, are penalized, limiting the investment in inventory for a single item to the detriment of support for other items.

Cost Function Relationships:

To show that Z-F optimization equation no. 6 holds, put:

$$\alpha_n = \frac{M(n)}{M(n+1)}, \qquad \text{Eq. (D32)}$$

where M is defined by Equation (D14). Then using Z-F equation no. 2c, which holds because of Equation (D14), $$1 - \alpha_n = 1 - \frac{M(n)}{M(n+1)} = \frac{M(n+1) - M(n)}{M(n+1)} = \frac{m(n)}{M(n+1)}. \qquad \text{Eq. (D33)}$$

Replacing s by s−1 in Equation (D15) and applying Equations (D32) and (D33) yields $$c(s-1, S) = \frac{1}{M(S-s+1)} \left\{ \frac{K}{\mu_a} + \sum_{j=0}^{S-s} m(j)G(S-j) \right\} \qquad \text{Eq. (D}$$

$$= \frac{1}{M(\Delta+1)} \left\{ \frac{K}{\mu_a} + \sum_{j=0}^{\Delta-1} m(j)G(S-j) + m(\Delta)G(s) \right\}$$

$$= \frac{M(\Delta)}{M(\Delta+1)} \frac{1}{M(\Delta)} \left\{ \frac{K}{\mu_a} + \sum_{j=0}^{\Delta-1} m(j)G(S-j) \right\} +$$

$$\frac{m(\Delta)}{M(\Delta+1)} G(s)$$

$$= \alpha_\Delta c(s, S) + (1 - \alpha_\Delta)G(s)$$

Thus the Z-F condition on c(s, S) and G(s) holds. Note that the Z-F condition derivation does not depend on the particular form of G used—Eqs. (D12) or (A1), with or without a unimodal approximation will all satisfy the condition.

In other words, the Sahin cost function as modified according to an embodiment of the invention by including the two extra terms in equation A1, namely the requisition backorder term and IP penalty term, can be computed from the histogram distributions of inter-arrival times and demand sizes, and that from the modified Sahin objective function cost expressions can be derived with one or more, or all of, the properties required by Z-F. Thus the Z-F optimization applies, and can be applied to find the optimal values of the reorder point s and the requisitioning objective S.

According to an aspect of an embodiment, a method and computer system of determining minimum (s) and maximum (S) inventory control levels (s, S) for inventory items based upon a demand history of the inventory items, is provided by causing a computer to execute generating histograms of demand inter-arrival times (IA) and demand requisition sizes (RS), based upon the demand history of the inventory items; and computing an expected cost including two or more inventory item cost components of expected cost of ordering (116), expected cost of carrying inventory (107), or expected cost of outstanding backorders (108) for inventory control level (s, S) pairs, directly from frequency statistics of different demand IA and demand RS on an inventory item basis based upon the IA and RS histograms; and searching (120) a subset of possible inventory control levels (s, S) of each inventory item that minimizes the cost of ordering, holding inventory, and/or backorders, based upon the generated expected cost. The expected cost of outstanding backorders includes expected unit backorders and/or expected requisition backorders, and the expected cost of holding (carrying) inventory includes expected on-hand inventory and/or expected cost of on-hand inventory and expected cost of full inventory. The generating of the demand IA and RS histograms is without assuming probability distributions and/or not estimating parameters (mean and/or variance) for the probability distributions, thereby computing of the expected cost is without theoretical probability distributions. Parameter estimation at times can have errors close to 100%, thereby according to an aspect of the embodiments the computing of the expected cost without theoretical probability distributions substantially reduces errors in that cost.

A machine configured determines minimum (s) and maximum (S) inventory control levels (s, S) for inventory items based upon a demand history of the inventory items, such as demand inter-arrival times (IA) and demand requisition sizes (RS). An expected cost is computed including two or more inventory item cost components of expected cost of ordering, expected cost of carrying inventory, or expected cost of outstanding backorders for the inventory control levels (s, S), directly from frequency statistics of different demand IA and demand RS on an inventory item basis. An optimal inventory control level (s, S) of an inventory item is searched for, that minimizes the cost of ordering, carrying inventory, and/or backorders, based upon the generated expected cost.

Figure 8:
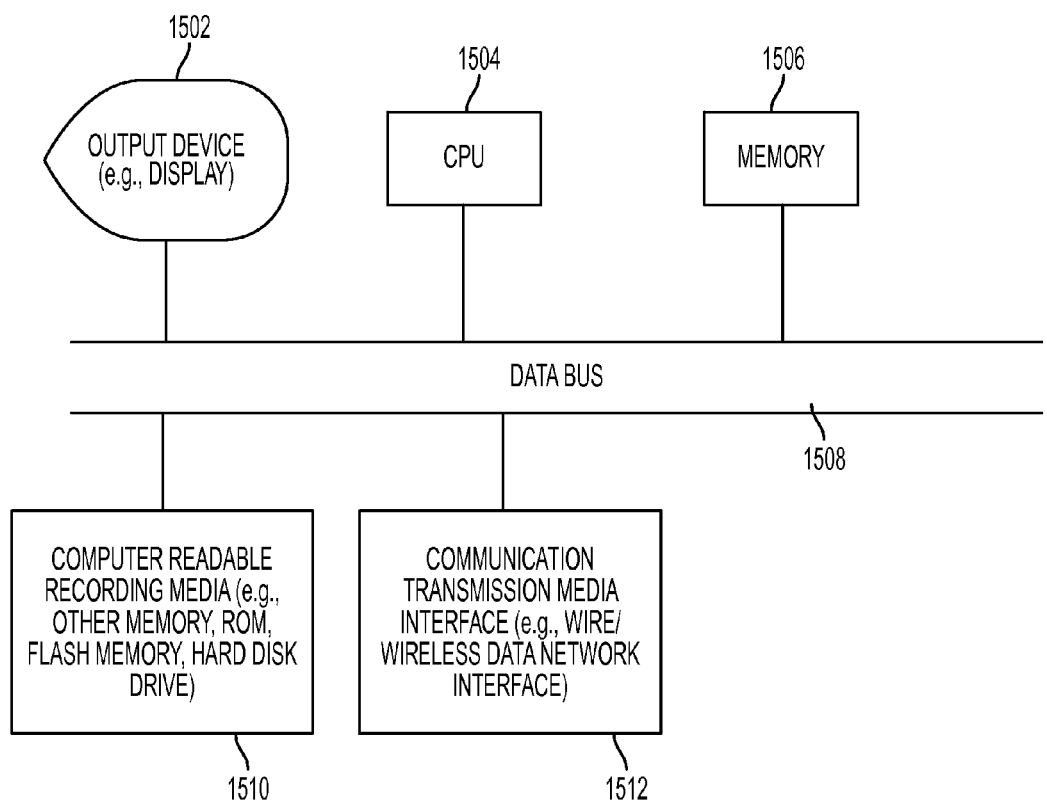
FIG. 8 is a functional block diagram of a computer for the embodiments of the invention.

FIG. 8 is a functional block diagram of a computer (hardware computing machine) for the embodiments of the invention, namely a computer configured to execute an adaptive method for setting inventory control levels from demand inter-arrival time and/or demand size statistics. In FIG. 8, the computer can be any computing device that can execute instructions to provide the described functions. Typically, the computer includes an input device, for example, keyboard, mouse, touch screen, etc., output device 1502, for example, a display to display a user interface or output information, printer, etc. One or more computer controller(s) or processing cores 1504 (e.g., a hardware central processing unit) executes instructions (e.g., a computer program or software) that control the apparatus to perform operations. According to an aspect of an embodiment, one or more networked computer servers, each with a number of processing cores (e.g., a 64-core server), execute the described operations in which jobs to calculate inventory control levels on inventory item basis are assigned to respective one or more processing cores.

Typically, a memory 1506 stores the instructions for execution by the controller 1504. According to an aspect of an embodiment, the apparatus reads/writes/processes data of any computer readable recording media 1510 and/or communication transmission media interface 1512. The communication transmission media interface is to data network with one or other machines (e.g., computers) to execute the described functions. The embodiments can be implemented via grid computing. The display 1502, the CPU 1504 (e.g., hardware logic circuitry based computer processor that processes instructions, namely software), the memory 1506, the computer readable media 1510, and the communication transmission media interface 1512 are in communication by one or more the data bus(es) 1508.

According to an aspect of the embodiments of the invention, any combinations of one or more of the described features, functions, operations, and/or benefits can be provided. A combination can be one or a plurality. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers. According to an aspect of an embodiment, the described features, functions, operations, and/or benefits can be implemented by and/or use computing hardware and/or software. The apparatus can comprise a controller (CPU) (e.g., a hardware logic circuitry based computer processor that processes or executes instructions, namely software/program), computer readable media, transmission communication interface (network interface), input device, and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing and/or configuring one or more apparatuses and/or computer processors, for example, in data network (e.g., Internet) communication, to execute the described operations. According to an aspect of an embodiment, a computer can instruct or request performing one or more of the described computations remotely and results returned for further processing and/or output, thereby achieving cloud computing for searching for inventory control levels according to the embodiments of the invention. The results produced can be output to an output device, for example, displayed on the display. An apparatus or device refers to a physical machine that performs operations, for example, a computer (physical computing hardware or machinery) that implement or execute instructions, for example, by way of software, which is code executed by computing hardware, and/or by way of computing hardware (e.g., in circuitry, etc.), to achieve the functions or operations being described. The functions of embodiments described can be implemented in any type of apparatus that can execute instructions or code. More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT).

Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method of determining minimum (s) and maximum (S) inventory control levels (s, S) for inventory items based upon a demand history of the inventory items, comprising:
   using a computer to execute:
      generating histograms of demand inter-arrival times (IA) and demand requisition sizes (RS), based upon the demand history of the inventory items;
      generating, for a set of control levels (s, S), a probability distribution for a lead time demand (LTD) in future, based upon the IA and/or RS histograms, and a probability distribution for an inventory position (IP) based upon the RS histogram;
      generating a probability distribution of on-hand inventory of an inventory item, for a lead time in future, directly from frequency statistics of different demand IA and demand RS on an inventory item basis based upon the probability distribution for the LTD and the IP;
      computing a cost function for an expected instantaneous cost of a given IP of the inventory item, experienced for the lead time in future, based upon the probability distribution of the on-hand inventory of the inventory item; and
      searching for the control levels (s, S) of the inventory item using the cost function or the expected instantaneous cost of the current IP of the inventory item.

2. The method according to claim 1, wherein the expected instantaneous cost of the given IP of the inventory item experienced for the lead time in future includes one or more of an instantaneous cost of outstanding backorders and an instantaneous cost of carrying inventory.

3. The method according to claim 2, wherein the instantaneous cost of carrying inventory includes expected on-hand inventory conditioned on a current IP and/or expected full IP, and the instantaneous cost of outstanding backorders includes unit backorders and requisition backorders.

4. The method according to claim 2, further comprising:
   averaging the instantaneous costs of outstanding backorders and carrying inventory across the probability distribution for the IP; and
   applying a unimodal approximation to the instantaneous costs of outstanding backorders and carrying inventory that meets one or more conditions for searching.

5. The method according to claim 4, wherein a total expected instantaneous cost of the inventory item experienced for the lead time in future includes a result of the averaging of the instantaneous costs of outstanding backorders and carrying inventory, and
   wherein a total expected cost includes the total expected instantaneous cost and expected inventory item replenishment cost.

6. The method according to claim 1, wherein the generating of the histograms comprises weighting the demand history of the inventory items by an adjustment factor that decreases as amount of time since data was collected increases.

7. The method according to claim 1, wherein the generating of the RS histogram comprises rescaling down requisition sizes of items with large requisition sizes by a virtual unit-of-issue factor and after the searching of the inventory item control levels (s, S), rescaling up by multiplying each of s and S by the virtual unit-of-issue factor.

8. A method of determining minimum (s) and maximum (S) inventory control levels (s, S) for inventory items based upon a demand history of the inventory items, comprising:
   using a computer to execute:
      generating a probability distribution for a lead time demand (LTD) in future and a probability distribution for an inventory position (IP), based upon demand inter-arrival times (IA) and demand requisition sizes (RS) of the inventory items from the demand history of the inventory items; and
      computing an expected cost including two or more inventory item cost components of expected cost of ordering, expected cost of carrying inventory, or expected cost of outstanding backorders for the inventory control levels (s, S), directly from frequency statistics of different demand IA and demand RS on an inventory item basis; and
      searching for inventory control levels (s, S) of each inventory item that minimizes the cost of ordering, carrying inventory, and/or backorders, based upon the computed expected cost.

9. The method according to claim 8, wherein
   the computing of expected cost of outstanding backorders includes computing expected cost of unit backorders and/or computing expected cost of requisition backorders, and
   the computing of expected cost of carrying inventory includes computing expected cost of on-hand inventory and/or computing expected cost of on-hand inventory and expected cost of full inventory.

10. The method according to claim 8, wherein the generating of the LTD and the IP probability distributions is based upon generating of histograms of the demand IA and the demand RS from the demand history of the inventory items.

11. The method according to claim 10, wherein the generating of the LTD and/or the IP probability distributions include a renewal process of one or more of a renewal function, a renewal density, or renewal-reward function.

12. The method according to claim 8, wherein the searching includes searching for a subset of inventory control levels (s, S) according to Zheng-Federgruen optimization.

13. The method according to claim 10, wherein the generating of the demand IA and RS histograms is without assuming probability distributions, and/or by not estimating mean and/or variance parameters for the probability distributions, thereby the computing of the expected cost is without theoretical probability distributions.

14. The method according to claim 8, wherein the searching for the inventory control levels (s, S) optimizes investment across inventory items to provide lowest total backorders and/or total replenishment cost.

15. An apparatus, comprising:
one or more computing processors configured to execute:
accessing a demand history of inventory items;
generating a probability distribution for a lead time demand (LTD) in future and a probability distribution for an inventory position (IP), based upon demand inter-arrival times (IA) and demand requisition sizes (RS) of the inventory items from the demand history of the inventory items; and
computing an expected cost including two or more inventory item cost components of expected cost of ordering, expected cost of carrying inventory, or expected cost of outstanding backorders for the inventory control levels (s, S), directly from frequency statistics of different demand IA and demand RS on an inventory item basis; and
searching for minimum (s) and maximum (S) inventory control levels (s,S) of each inventory item that minimizes the cost of ordering, carrying inventory, and/or backorders, based upon the computed expected cost.

16. The apparatus according to claim 15, wherein
the computing of expected cost of outstanding backorders includes computing expected cost of unit backorders and/or computing expected cost of requisition backorders, and
the computing of expected cost of carrying inventory includes computing expected cost of on-hand inventory and/or computing expected cost of on-hand inventory and expected cost of full inventory.

17. A computer, comprising:
one or more computer processors that execute:
accessing a demand history of inventory items;
generating, for a set of minimum (s) and maximum (S) inventory control levels (s, S), a probability distribution for a lead time demand (LTD) in future, based upon demand inter-arrival times (IA) and/or demand requisition sizes (RS) from the demand history of the inventory items, and a probability distribution for an inventory position (IP) based upon the demand history of the inventory items;
generating a probability distribution of on-hand inventory of an inventory item, for a lead time in future, directly from frequency statistics of different demand IA and demand RS on an inventory item basis based upon the probability distribution for the LTD and the IP;
computing a cost function for an expected instantaneous cost of a given IP of the inventory item, experienced for the lead time in future, based upon the probability distribution of the on-hand inventory of the inventory item; and
searching for the control levels (s, S) of the inventory item using the cost function for the expected instantaneous cost of the given IP of the inventory item.

18. The computer according to claim 17, wherein the expected instantaneous cost of the given IP of the inventory item experienced for the lead time in future includes one or more of an instantaneous cost of outstanding backorders and an instantaneous cost of carrying inventory.

19. The computer according to claim 18, wherein the instantaneous cost of carrying inventory includes expected cost of on-hand inventory conditioned on a current IP and/or expected full IP, and the instantaneous cost of outstanding backorders includes cost of unit backorders and requisition backorders.

20. The computer according to claim 18, further comprising:
averaging the instantaneous costs of outstanding backorders and carrying inventory across the probability distribution for the IP; and
applying a unimodal approximation to the instantaneous costs of outstanding backorders and carrying inventory that meets one or more conditions for searching.

21. The computer according to claim 20, wherein a total expected instantaneous cost of the inventory item experienced for the lead time in future includes a result of the averaging of the instantaneous costs of outstanding backorders and carrying inventory, and
wherein a total expected cost includes the total expected instantaneous cost and expected inventory item replenishment cost.

22. The computer according to claim 17, wherein
the generating of the LTD and the IP probability distributions is based upon generating of histograms of the demand IA and the demand RS from the demand history of the inventory items and without assuming probability distributions, and/or by not estimating mean and/or variance parameters for the probability distributions, thereby the computing of the cost function is without theoretical probability distributions.

23. The method according to claim 17, wherein the searching for the inventory control levels (s, S) optimizes investment across inventory items to provide lowest total backorders and/or total replenishment cost.

* * * * *

UNITED STATES PATENT AND TRADEMARK OFFICE
CERTIFICATE OF CORRECTION

Page 1 of 1

PATENT NO. : 8,600,843 B2
APPLICATION NO. : 13/236143
DATED : December 3, 2013
INVENTOR(S) : Tovey C. Bachman et al.

It is certified that error appears in the above-identified patent and that said Letters Patent is hereby corrected as shown below:

In the Claims
Column 33, Line 47, In Claim 1, delete "or" and insert -- for --, therefor.
Column 33, Line 48, In Claim 1, delete "current IP" and insert -- given IP --, therefor.
Column 34, Line 13, In Claim 7, delete "resealing" and insert -- rescaling --, therefor.
Column 34, Line 16, In Claim 7, delete "resealing" and insert -- rescaling --, therefor.
Column 35, Line 22, In Claim 15, delete "(s,S)" and insert -- (s, S) --, therefor.
Column 36, Line 18, In Claim 19, after "and" insert -- cost of --.
Column 36, Line 45, In Claim 23, delete "method" and insert -- computer --, therefor.

Signed and Sealed this
Twenty-fifth Day of March, 2014

Michelle K. Lee
*Deputy Director of the United States Patent and Trademark Office*